US012578626B2

(12) United States Patent
Kim et al.

(10) Patent No.: US 12,578,626 B2
(45) Date of Patent: Mar. 17, 2026

(54) CAMERA DEVICE

(71) Applicant: LG INNOTEK CO., LTD., Seoul (KR)

(72) Inventors: Hyun Soo Kim, Seoul (KR); Jung Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 180 days.

(21) Appl. No.: 18/561,549

(22) PCT Filed: May 13, 2022

(86) PCT No.: PCT/KR2022/006885
§ 371 (c)(1),
(2) Date: Nov. 16, 2023

(87) PCT Pub. No.: WO2022/245057
PCT Pub. Date: Nov. 24, 2022

(65) Prior Publication Data
US 2024/0248375 A1　　Jul. 25, 2024

(30) Foreign Application Priority Data

May 21, 2021　(KR) ........................ 10-2021-0065816

(51) Int. Cl.
*G03B 13/36*　　(2021.01)
*H04N 23/50*　　(2023.01)
*H04N 23/68*　　(2023.01)

(52) U.S. Cl.
CPC ............. *G03B 13/36* (2013.01); *H04N 23/50* (2023.01); *H04N 23/687* (2023.01)

(58) Field of Classification Search
CPC ........... G03B 13/36; G03B 2205/0007; G03B 2205/0038; G03B 2205/0069; G03B 3/10;
(Continued)

(56) References Cited

U.S. PATENT DOCUMENTS

2017/0176768 A1　6/2017　Kim
2021/0258491 A1* 8/2021　Park ...................... H04N 23/57

FOREIGN PATENT DOCUMENTS

EP　　　　3 817 362 A1　　5/2021
JP　　　　2020-170170 A　　10/2020
(Continued)

OTHER PUBLICATIONS

International Search Report dated Aug. 26, 2022 in International Application No. PCT/KR2022/006885.
(Continued)

*Primary Examiner* — Shahbaz Nazrul
(74) *Attorney, Agent, or Firm* — Saliwanchik, Lloyd & Eisenschenk

(57) ABSTRACT

The present embodiment relates to a camera device comprising: a fixed unit; a moving unit comprising an image sensor; an OIS driving unit moving the moving unit with respect to the fixed unit; an auto focus assembly disposed in the fixed unit; and a lens coupled to the auto focus assembly, wherein the auto focus assembly comprises: a housing disposed in the fixed unit; a bobbin disposed in the housing and coupled to the lens; an AF driving unit moving the bobbin respect to the housing; and an elastic member connecting the housing with the bobbin, and the housing of the auto focus assembly is fixed to the fixed unit.

20 Claims, 16 Drawing Sheets

(58) Field of Classification Search
CPC . G03B 5/00; G03B 30/00; G03B 5/04; G03B
17/02; G03B 2205/0015; H04N 23/50;
H04N 23/687; H04N 23/54; H04N 23/57;
H04N 23/55; H04N 23/51
See application file for complete search history.

(56) References Cited

FOREIGN PATENT DOCUMENTS

| | | | |
|---|---|---|---|
| KR | 10-2017-0021682 A | 2/2017 | |
| KR | 10-2146385 B1 | 8/2020 | |
| KR | 10-2020-0114251 A | 10/2020 | |
| KR | 10-2021-0026659 A | 3/2021 | |
| KR | 10-2021-0044871 A | 4/2021 | |
| WO | WO-2020004975 A1 * | 1/2020 | ........... H04N 23/687 |

OTHER PUBLICATIONS

Supplementary European Search Report dated May 8, 2025 in
European Application No. 22804912.8.

* cited by examiner

CAMERA DEVICE

CROSS-REFERENCE TO RELATED APPLICATIONS

This application is the U.S. national stage application of International Patent Application No. PCT/KR2022/006885, filed May 13, 2022, which claims the benefit under 35 U.S.C. § 119 of Korean Application No. 10-2021-0065816, filed May 21, 2021, the disclosures of each of which are incorporated herein by reference in their entirety.

TECHNICAL FIELD

The teachings in accordance with exemplary and non-limiting embodiments of this invention generally relate to a camera device.

BACKGROUND ART OF THE INVENTION

A camera device is a device that takes pictures or videos of a subject, and is mounted on optical instruments such as smartphones, drones, and vehicles.

To improve image quality, camera devices require a handshaking correction function (Optical Image Stabilization, OIS) to compensate for image blurs caused by user movement.

The handshaking correction (image stabilization) function in camera devices is performed by moving a lens in a direction perpendicular to the optical axis. However, due to the recent trend of high pixelation, a diameter of the lens has increased, which increases the weight of the lens, and it is difficult to secure an electromagnetic force to move the lens within a limited space.

DETAILED DESCRIPTION OF INVENTION

Technical Subject

The exemplary present embodiment aims to provide a camera device that performs an image stabilization function by moving an image sensor.

The present embodiment seeks to provide a camera device in which an image sensor is driven in three axes, namely an x-axis shift, a y-axis shift, and a z-axis roll.

Technical Solution

In one general aspect of the present invention, there may be provided a camera device, comprising: a fixed unit; a moving unit comprising an image sensor; an OIS driving unit moving the moving unit with respect to the fixed unit; an auto focus assembly disposed in the fixed unit; and a lens coupled to the auto focus assembly, wherein the auto focus assembly comprises: a housing disposed in the fixed unit; a bobbin disposed in the housing and coupled to the lens; an AF driving unit moving the bobbin with respect to the housing; and an elastic member connecting the housing with the bobbin, and the housing of the auto focus assembly is fixed to the fixed unit.

Preferably, the housing of the auto focus assembly may be coupled to the fixed unit using an adhesive.

Preferably, the fixed unit may comprise a base, a first holder secured to an upper surface of the base, and a first substrate disposed on an upper surface of the first holder, and the housing of the auto focus assembly may be secured to the first holder.

Preferably, the first holder may comprise a hole, and protruding portion projecting from four corner regions of an inner circumferential surface of the hole, and a lower surface of the housing of the auto focus assembly may be disposed on the protruding portion of the first holder.

Preferably, at least a portion of the outer circumferential surface of the auto focus assembly may be spaced apart from the inner circumferential surface of the first holder.

Preferably, the auto focus assembly may be inserted and engaged from above into the hole of the first holder.

Preferably, the AF driving unit may move the lens in an optical axis direction relative to the housing, and the OIS driving unit may move the image sensor in a direction perpendicular to the optical axis direction relative to the fixed unit.

Preferably, the AF driving unit may comprise an AF coil disposed on the bobbin, an AF magnet disposed in the housing and disposed in a position corresponding to that of the AF coil, and the OIS driving unit may comprise an OIS magnet disposed in the fixed unit, an OIS coil disposed in the moving unit and disposed in a position corresponding to that of the OIS magnet, wherein the AF magnet and the OIS magnet may be spaced apart from each other.

Preferably, the AF magnet may not overlap with the OIS magnet in a direction perpendicular to the optical axis direction.

Preferably, the AF magnet may comprise a wire disposed in an optical axis direction, while the wire connecting the first substrate and the moving part.

Preferably, the moving unit may comprise a second substrate on which the image sensor is disposed, a second holder coupled to the second substrate, and a terminal member coupled to the second holder, wherein the terminal member may comprise a body part, a terminal disposed on the body part, and wherein the terminal may comprise a first portion disposed on the body part, a second portion extending from the first portion and coupled to the wire, and a third portion extending from the first portion and coupled to the second substrate.

Preferably, the auto focus assembly may comprise a sensing magnet and a correction magnet disposed opposite each other on the bobbin, a sensing substrate electrically connected to the first substrate, and a driver IC comprising a sensor disposed on the sensing substrate and sensing the sensing magnet.

Preferably, the elastic member may comprise an upper elastic member and a lower elastic member disposed below the upper elastic member, the lower elastic member comprising two lower elastic members spaced apart from each other, and the two lower elastic members may electrically connect the sensing substrate and the AF coil.

Preferably, the base may comprise a hole overlapping the image sensor in the optical axis direction, and a stiffener covering the hole in the base may be disposed on a lower surface of the base.

In another general aspect of the present invention, there may be provided an optical instrument, comprising: a body; a camera device disposed on the body; and a display disposed on the body and outputting a video or image taken by the camera device.

In still another general aspect of the present invention, there may be provided a camera device comprising: a first holder; an image sensor disposed on one side of the first holder; an OIS driving unit for moving the image sensor relative to the first holder; an auto focus assembly coupled to the first holder; and a lens coupled to the auto focus assembly, wherein the auto focus assembly may comprise a housing disposed on the first holder, a bobbin disposed within the housing and coupled to the lens, an AF driving unit for moving the bobbin relative to the housing, and an elastic member connecting the housing and the bobbin.

Preferably, the camera device may comprise a second holder disposed on one side of the first holder, wherein the image sensor may be integrally movable with the second holder.

Preferably, the first holder may comprise a hole, and at least a portion of the auto focus assembly may be disposed in the hole of the first holder.

Preferably, at least a portion of an outer circumferential surface of the auto focus assembly may be spaced apart from an inner circumferential surface of the hole of the first holder.

Preferably, the housing of the auto focus assembly may be coupled to the first holder using an adhesive.

Preferably, the first holder may comprise protruding portion projecting from four corner regions of the inner circumferential surface of the hole, and a lower surface of the housing of the auto focus assembly may be disposed on the protruding portion of the first holder.

Preferably, the AF driving unit may comprise an AF coil disposed on the bobbin, and an AF magnet disposed in the housing and disposed in a position corresponding to that of the AF coil, and the OIS driving unit may comprise an OIS magnet disposed in the first holder, and an OIS coil disposed in the second holder and disposed in a position corresponding to that of the OIS magnet, wherein the AF magnet and the OIS magnet may be spaced apart from each other.

In still further general aspect of the present invention, there may be provided a camera device, comprising: a fixed unit comprising a first substrate; a moving unit comprising an image sensor; an OIS driving unit for moving the moving unit relative to the fixed unit; an auto focus assembly disposed on the fixed unit; and a lens coupled to the auto focus assembly, wherein the auto focus assembly may comprise a housing disposed on the fixed unit, a bobbin disposed within the housing and coupled to the lens, an AF driving unit for moving the bobbin relative to the housing, and an elastic member connecting the housing and the bobbin, wherein the first substrate may overlap with the auto focus assembly in a direction perpendicular to an optical axis direction.

Advantageous Effects

Through the exemplary embodiments, the image sensor can be moved to perform the OIS (handshaking correction function).

A module height can be reduced according to an exemplary embodiment of the present invention, as the autofocus assembly is coupled within the image stabilization assembly.

Furthermore, in the present embodiment, the auto focus assembly can be assembled after the image sensor wire bonding process. In other words, the present embodiment can facilitate the wire bonding process of the image sensor.

BRIEF DESCRIPTION OF DRAWINGS

Figure 5:
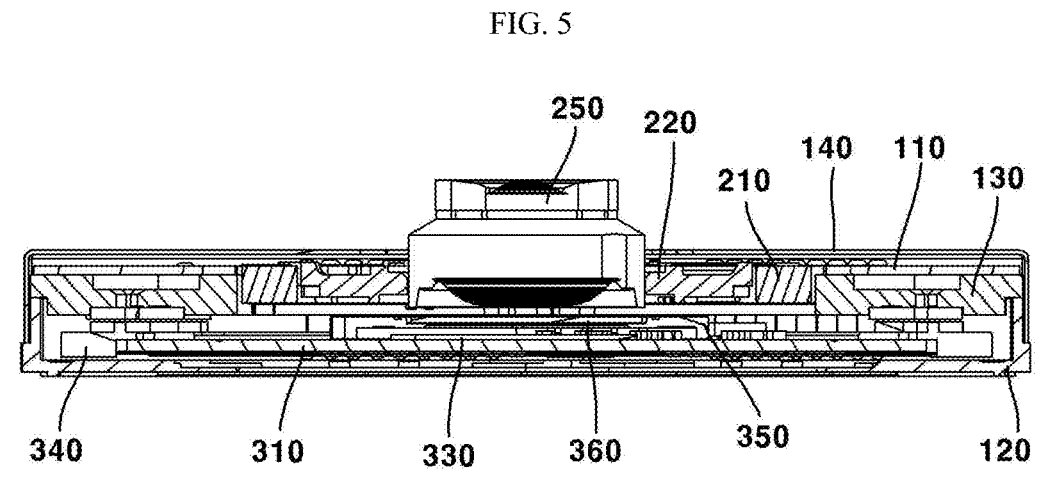

FIG. 5 is a cross-sectional view from C-C of FIG. 2.

Figure 12:
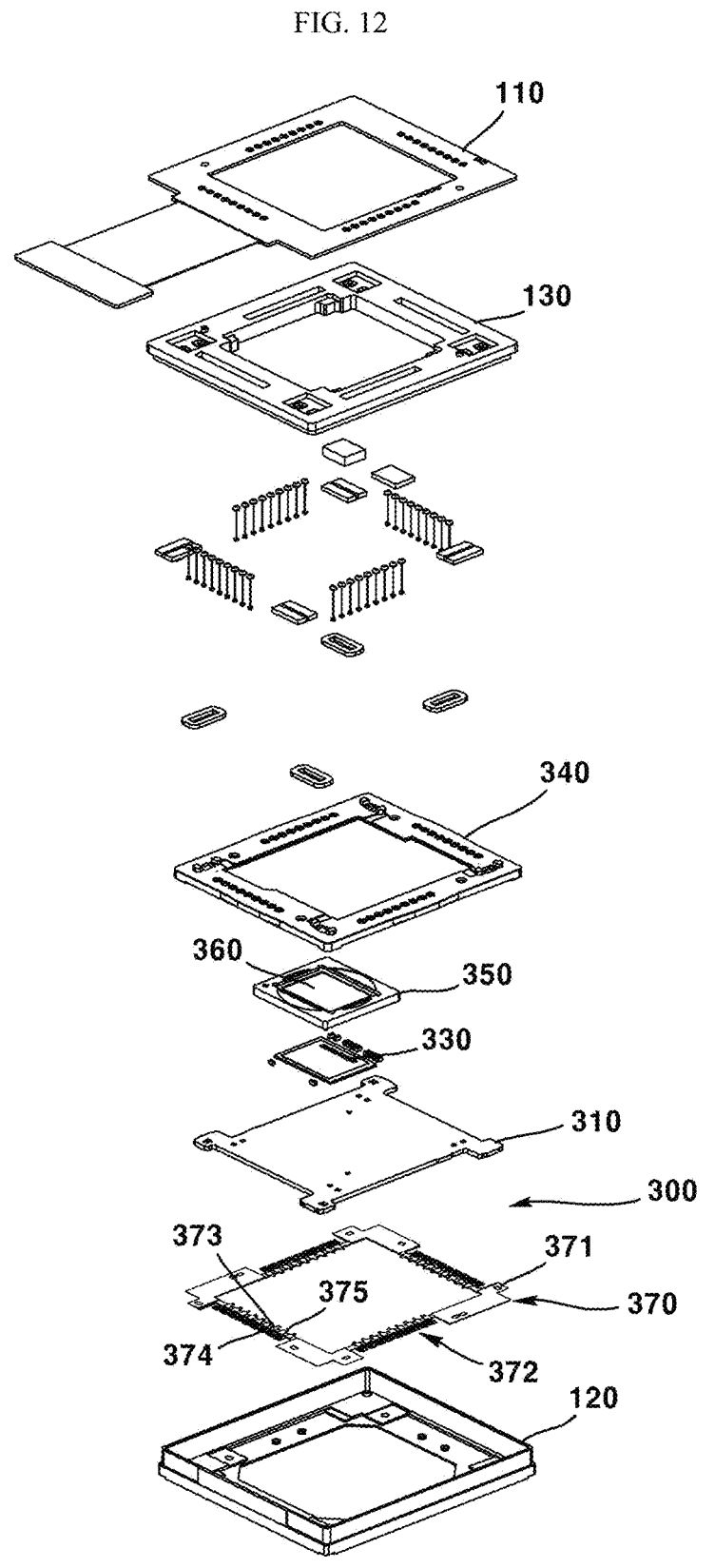

FIG. 12 is an exploded view of a fixed unit and a moving unit of a camera device according to an exemplary embodiment of the present invention.

FIG. 15 is a drawing to illustrate an operation in which an image sensor of a camera device according to an exemplary embodiment of the present invention is shifted along the X-axis.

FIG. 16 is a drawing to illustrate an operation in which an image sensor of a camera device according to an exemplary embodiment of the present invention is shifted along a y-axis.

FIG. 17 is a drawing to illustrate an operation in which an image sensor of a camera device according to an exemplary embodiment of the present invention is rolled about a z-axis.

BEST MODE

Hereinafter, exemplary embodiments of the present invention will be described in detail with reference to the accompanying drawings.

However, the technical ideas of the present invention are not limited to the specific embodiments described, but may be implemented in a variety of different forms, and one or more of its components may be optionally combined or substituted between embodiments within the scope of the present invention.

Furthermore, terms (comprising technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may comprise the plural unless the context otherwise requires, and references to "at least one (or more) of A and (or) B and C" may comprise one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can comprise cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" comprises not only when two components are in direct contact with each other, but also when one or more other components are formed or disposed between the two components. Furthermore, when expressed as "above" or "below", it may comprise the meaning of upward as well as downward with respect to a single component.

Hereinafter, a camera device according to an exemplary embodiment of the present invention will be described with reference to the accompanying drawings.

Figure 1:
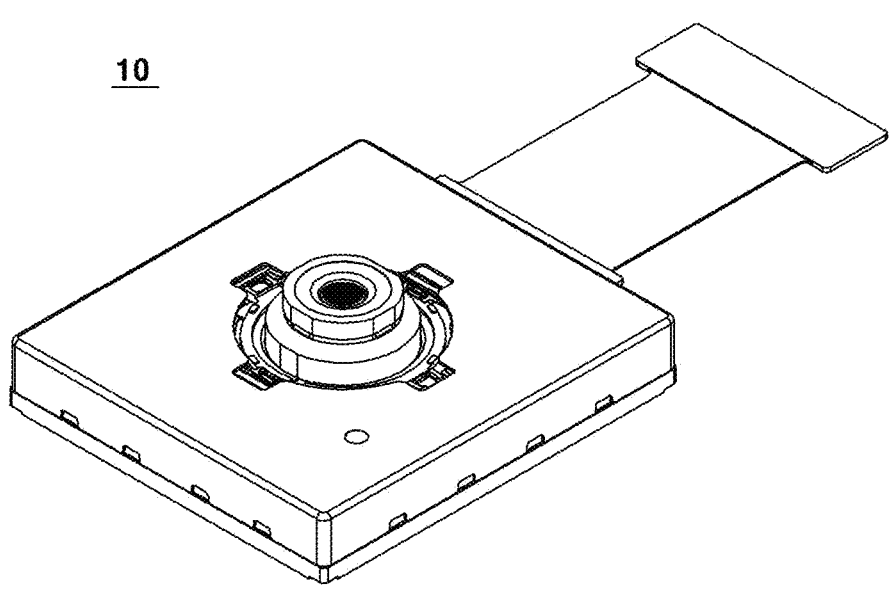
FIG. 1 is a perspective view of a camera device according to an exemplary embodiment of the present invention.
Figure 2:
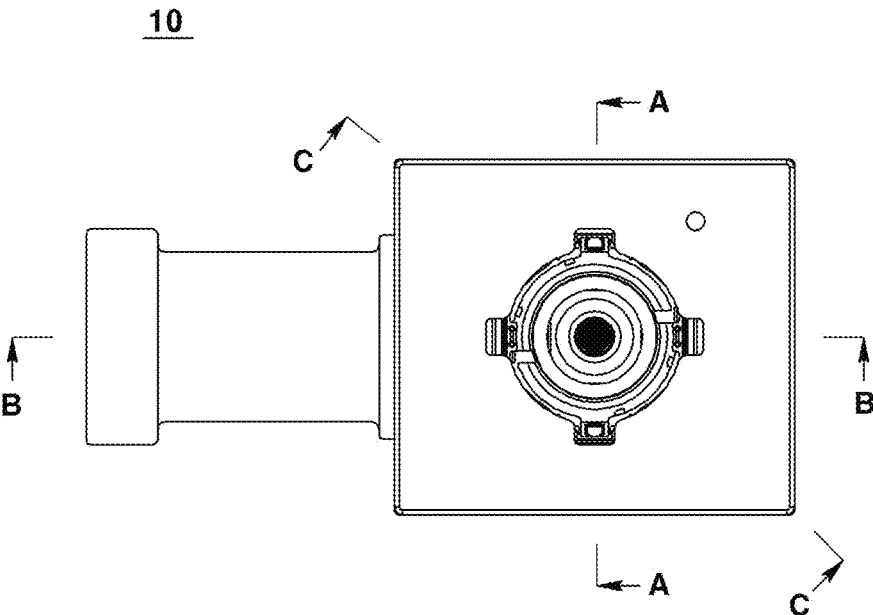
FIG. 2 is a top view of a camera device according to an exemplary embodiment of the present invention.
Figure 3:
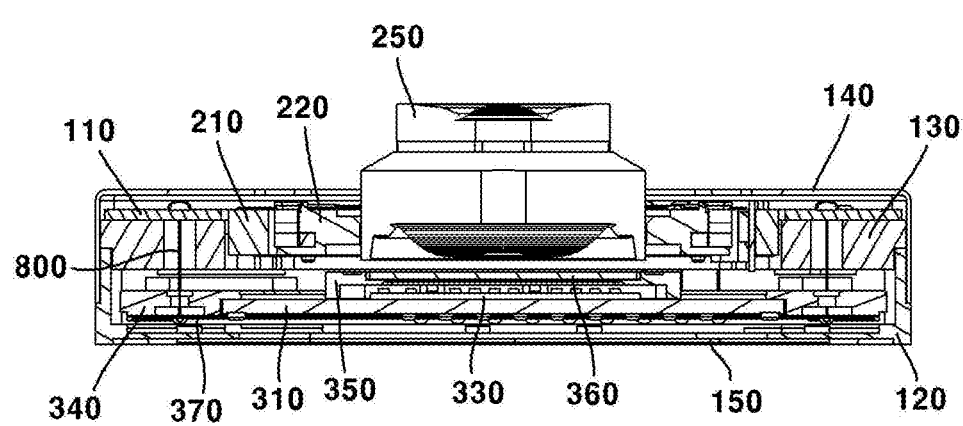
FIG. 3 is a cross-sectional view from A-A of FIG. 2.
Figure 4A:
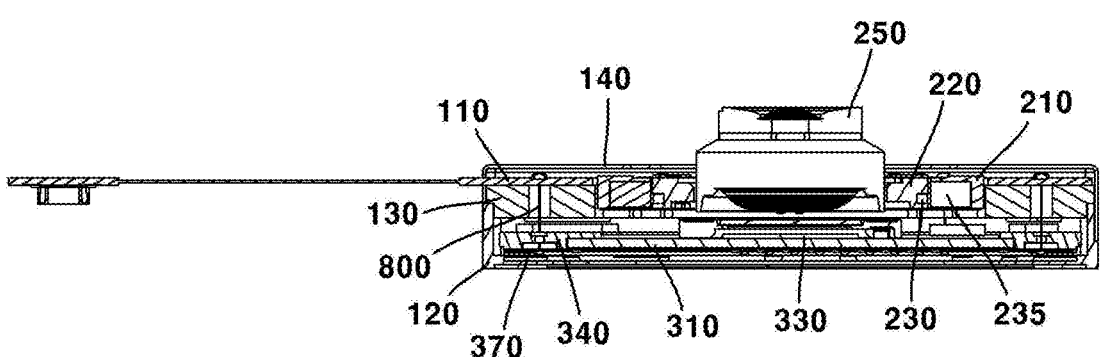
FIG. 4*a* is a cross-sectional view from B-B of FIG. 2.
Figure 4B:
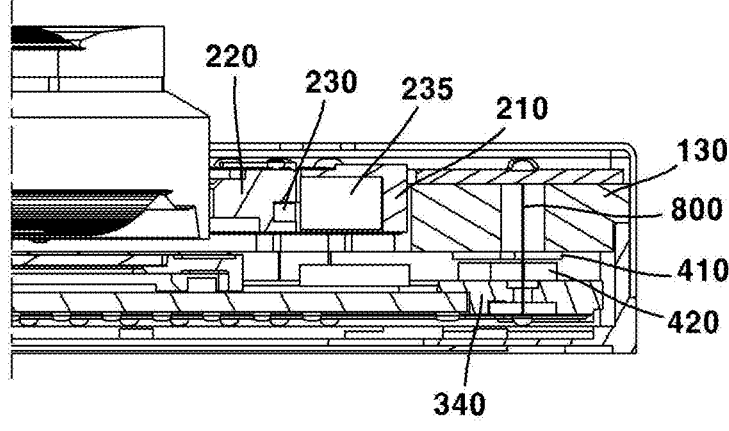
FIG. 4*b* is a partially expanded view of FIG. 4*a*.
Figure 6:
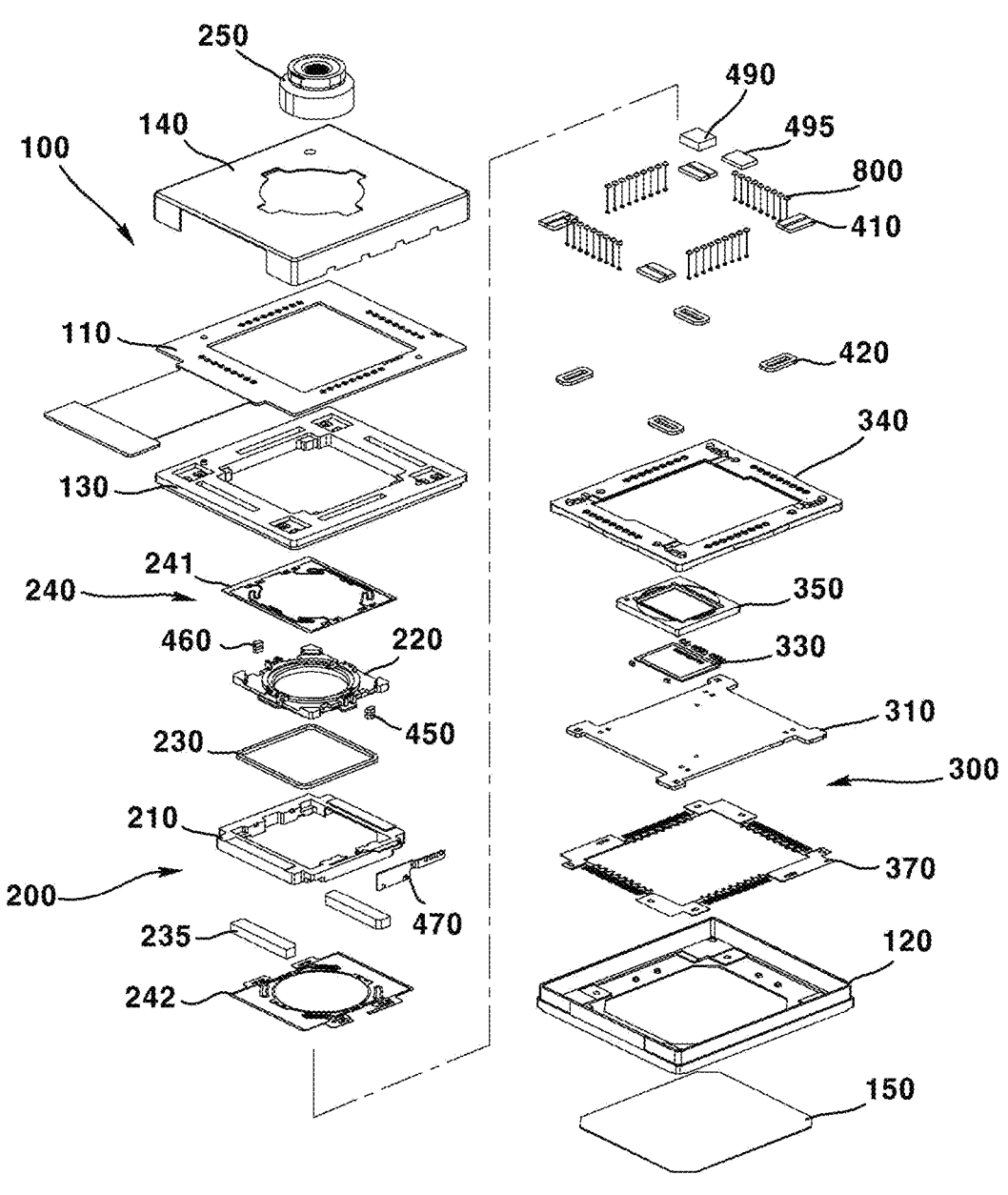
FIG. 6 is an exploded perspective view of a camera device according to an exemplary embodiment of the present invention.
Figure 7:
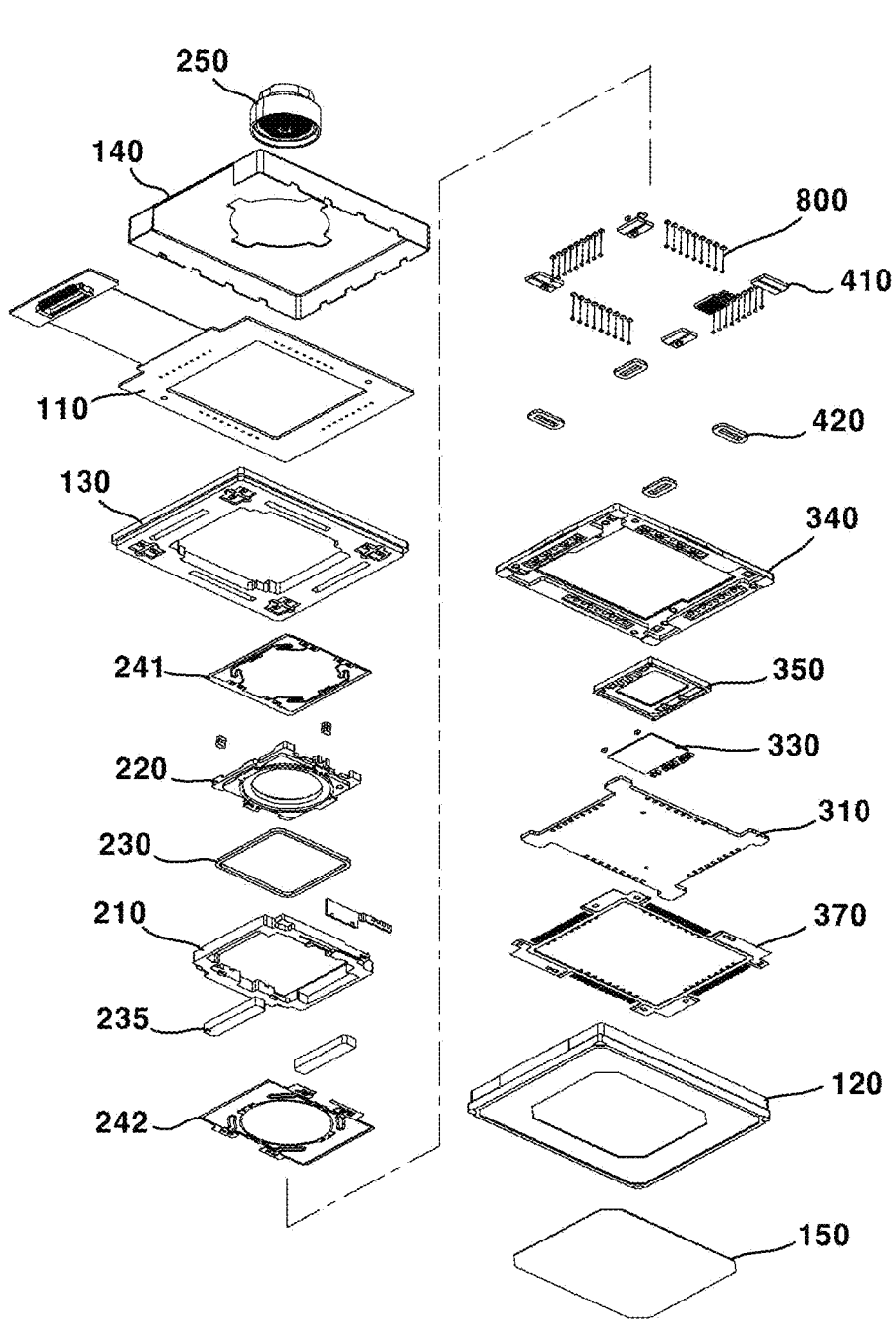
FIG. 7 is an exploded perspective view of a camera device according to an exemplary embodiment of the present invention from a different orientation than FIG. 6.
Figure 8:
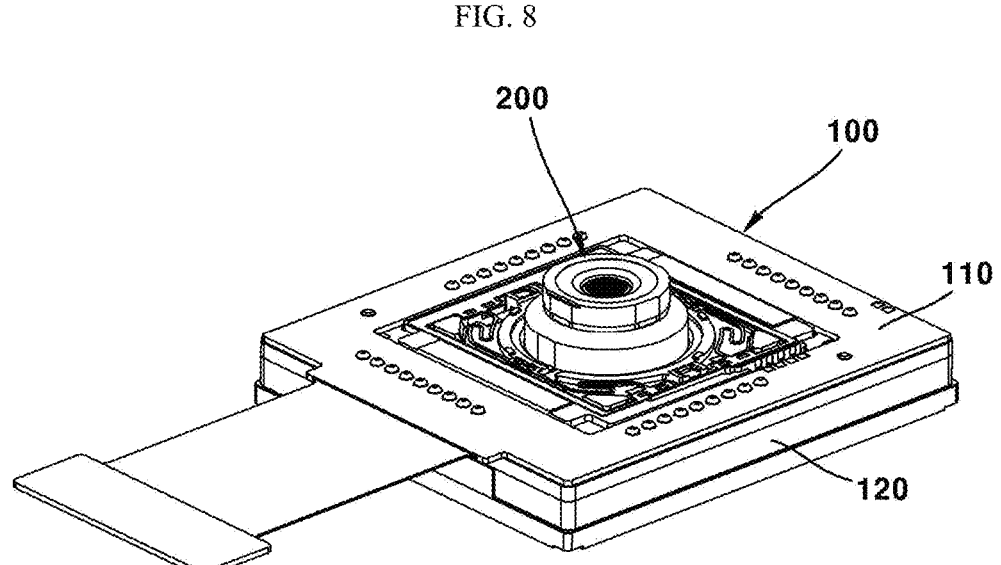
FIG. 8 is a perspective view of a camera device according to an exemplary embodiment of the present invention with a cover member omitted therefrom.
Figure 9:
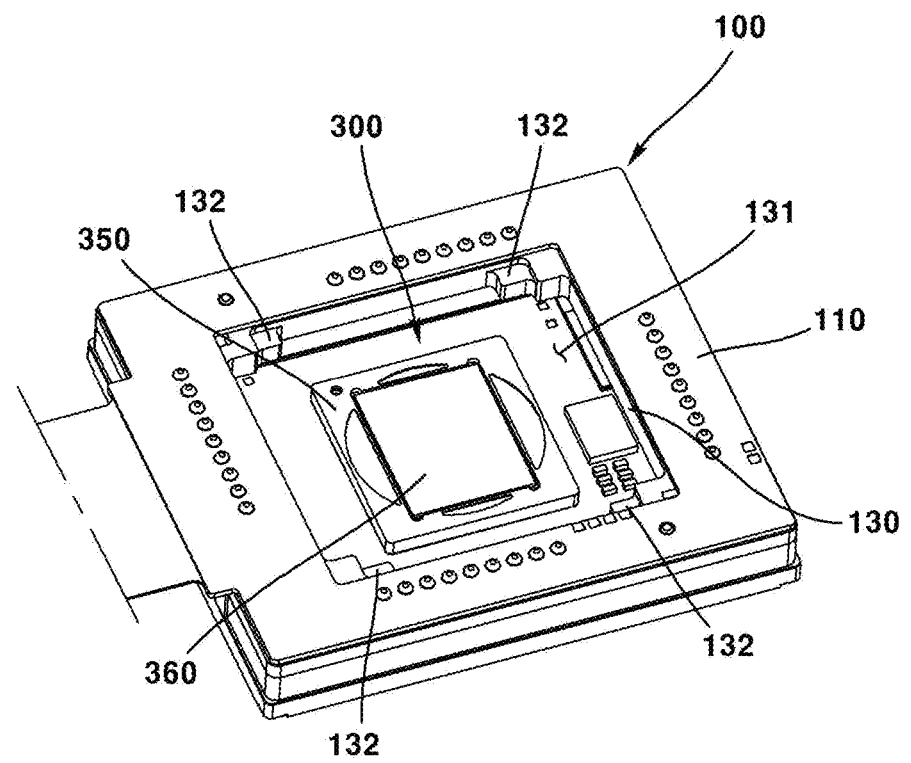
FIG. 9 is a perspective view of FIG. 8 with the auto focus assembly omitted.
Figure 10:
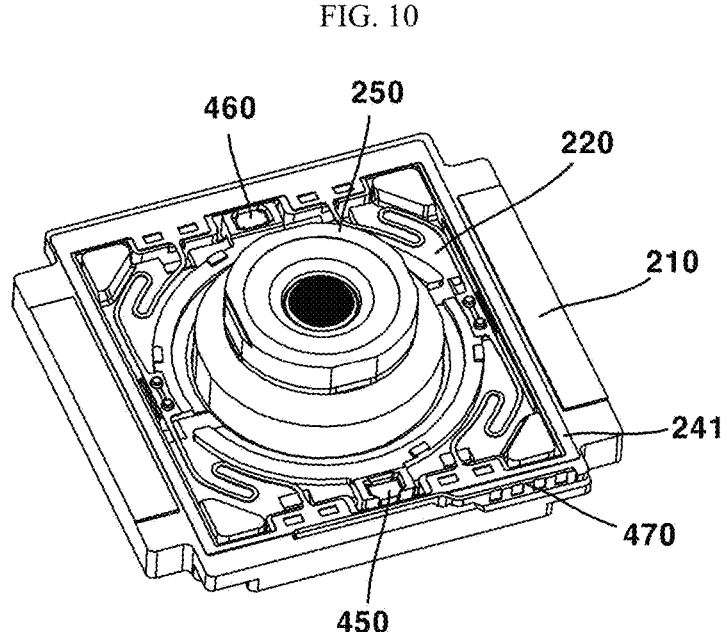
FIG. 10 is a perspective view of an auto focus assembly of a camera device according to an exemplary embodiment of the present invention.
Figure 11:
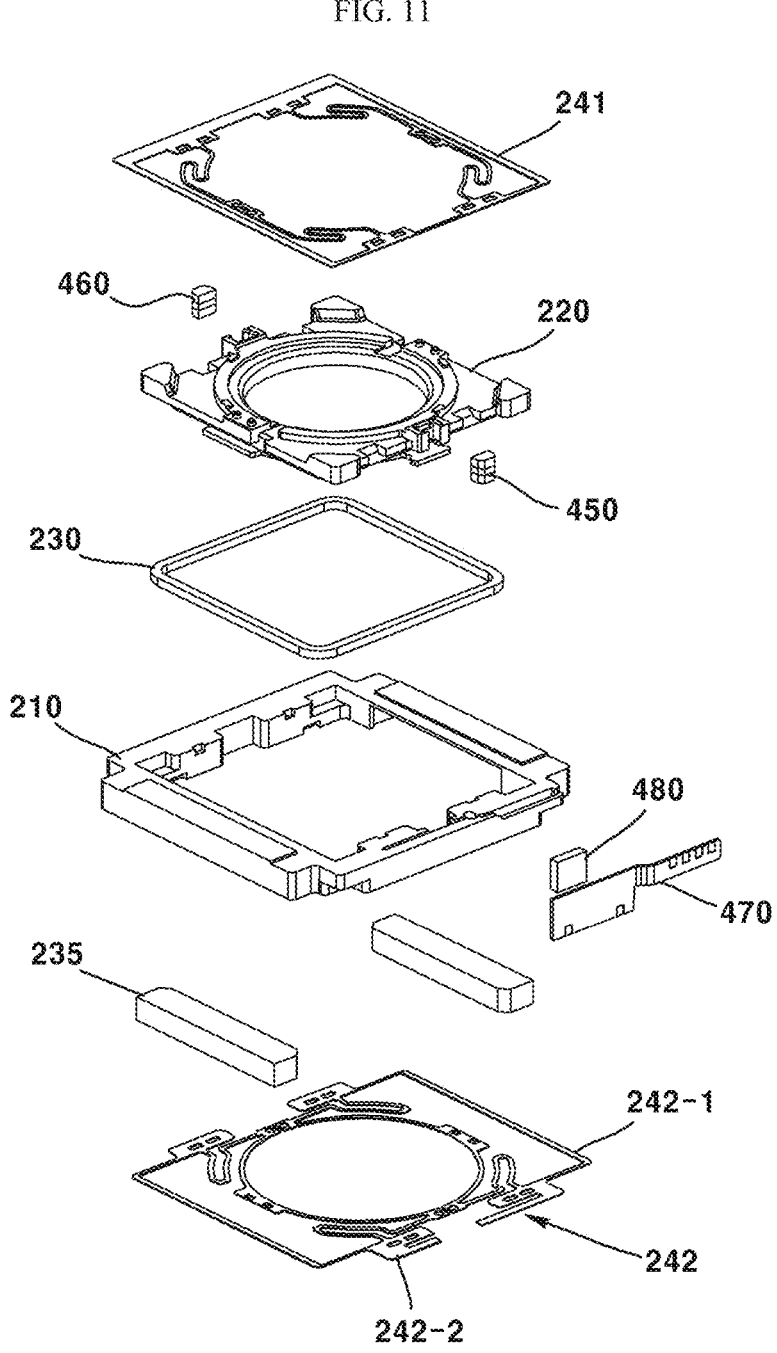
FIG. 11 is an exploded view of an auto focus assembly of a camera device according to an exemplary embodiment of the present invention.
Figure 13:
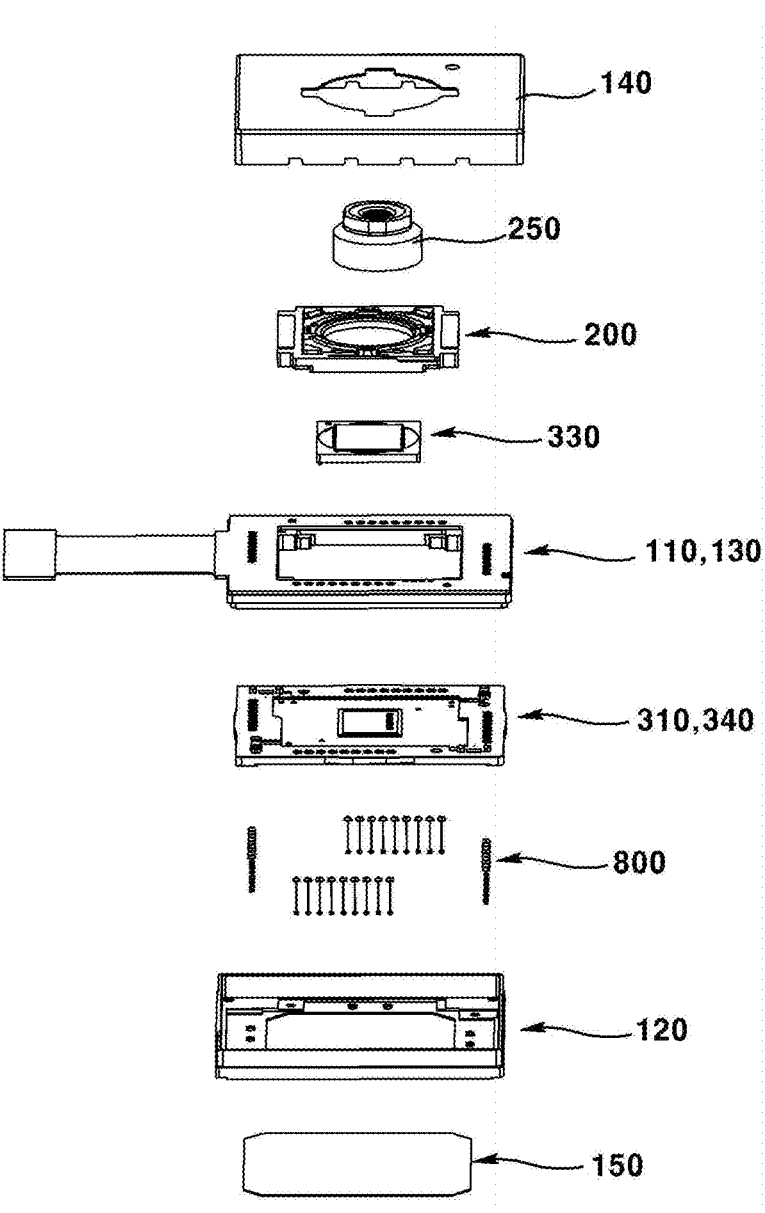
FIG. 13 is an exploded view of a camera device according to an exemplary embodiment of the present invention.

FIG. 1 is a perspective view of a camera device according to an exemplary embodiment of the present invention, FIG. 2 is a top view of a camera device according to an exemplary embodiment of the present invention, FIG. 3 is a cross-sectional view from A-A of FIG. 2, FIG. 4a is a cross-sectional view from B-B of FIG. 2, FIG. 4b is a partially expanded view of FIG. 4a, FIG. 5 is a cross-sectional view from C-C of FIG. 2, FIG. 6 is an exploded perspective view of a camera device according to an exemplary embodiment of the present invention, FIG. 7 is an exploded perspective view of a camera device according to an exemplary embodiment of the present invention from a different orientation than FIG. 6, FIG. 8 is a perspective view of a camera device according to an exemplary embodiment of the present invention with a cover member omitted therefrom, FIG. 9 is a perspective view of FIG. 8 with the auto focus assembly omitted, FIG. 10 is a perspective view of an auto focus assembly of a camera device according to an exemplary embodiment of the present invention, FIG. 11 is an exploded view of an auto focus assembly of a camera device according to an exemplary embodiment of the present invention, FIG. 12 is an exploded view of a fixed unit and a moving unit of a camera device according to an exemplary embodiment of the present invention, and FIG. 13 is an exploded view of a camera device according to an exemplary embodiment of the present invention.

A camera device (10) may take at least one of an image and a video. The camera device (10) may be a camera. The camera device (10) may be a camera module. The camera device (10) may be a camera assembly. The camera device (10) may be a camera unit. The camera device (10) may comprise a lens driving device. The camera device (10) may comprise a sensor driving device. The camera device (10) may comprise a voice coil motor (VCM). The camera device (10) may comprise an auto focus assembly. The camera device (10) may comprise an image stabilization assembly. The camera device (10) may comprise an auto focus unit. The camera device (10) may comprise an image stabilization device. The camera device (10) may comprise an actuator. The camera device (10) may comprise a lens-driven actuator. The camera device (10) may comprise a sensor-driven actuator. The camera device (10) may comprise an auto focus actuator. The camera device (10) may comprise an image stabilization actuator.

The camera device (10) may comprise a fixed unit (100). The fixed unit (100) may be a relatively fixed portion of a moving unit (300) as it moves. The fixed unit (100) may accommodate an auto focus assembly (200). The fixed unit (100) can accommodate the moving unit (300). The fixed unit (100) may be disposed on an outer side of the auto focus assembly (200). The fixed unit (100) may be disposed on an outer side of the moving unit (300).

The camera device (10) may comprise a first substrate (110). The fixed unit (100) may comprise the first substrate (110). The first substrate (110) may be a main board. The first substrate (110) may be a substrate. The first substrate (110) may be a printed circuit board (PCB). The first substrate (110) may be connected to a power source of the optical instrument (1). The first substrate (110) may comprise a connector connected to a power source of the optical instrument (1). The first substrate (110) may be disposed on an upper surface of a first holder (130). The first substrate (110) may be disposed on an upper surface of the first holder (130). The first substrate (110) may be disposed on an upper surface of a base (120). The first substrate (110) may be disposed underneath an upper surface of a cover member (140). The first substrate (110) may be disposed between the first holder (130) and the upper surface of the cover member (140). The first substrate (110) may overlap the auto focus assembly (200) in a direction perpendicular to the optical axis direction.

Throughout the specification, the first substrate (110) has been described as a component of the fixed unit (100), but the first substrate (110) may also be understood as a separate configuration from the fixed unit (100).

The camera device (10) may comprise a base (120). The fixed unit (100) may comprise the base (120). The base (120) may be disposed below the first holder (130). The base (120) may be secured to the first holder (130). The base (120) may be coupled to the first holder (130). The base (120) may be disposed below the first substrate (110). The base (120) may be secured to the first substrate (110). The base (120) may be coupled to the first substrate (110).

The camera device (10) may comprise a first holder (130). The fixed unit (100) may comprise the first holder (130). The first holder (130) may be disposed on the base (120). The first holder (130) may be secured to the base (120). The first holder (130) may be coupled to the base (120). The first holder (130) may be adhesively bonded to the base (120) using an adhesive. The first holder (130) may be secured on top of the base (120). The first holder (130) may be disposed on the base (120). The first holder (130) may be disposed on top of the base (120). The first holder (130) may be secured on top of the base (120). The first holder (130) may be coupled to the top of the base (120). The first holder (130) may be adhesively bonded to the top of the base (120) using an adhesive. The first holder (130) may be disposed underneath the first substrate (110). The first holder (130) may be formed as a separate member from the base (120).

The first holder (130) may comprise a hole (131). The hole (131) may be a hollow hole. At least a portion of the auto focus assembly (200) may be disposed in the hole (131)

of the first holder (130). The auto focus assembly (200) may be inserted into and coupled to the hole (131) of the first holder (130) from above. At least a portion of the outer circumferential surface of the auto focus assembly (200) may be spaced apart from the inner circumferential surface of the hole (131) of the first holder (130).

The first holder (130) may comprise protruding portion (132). The protruding portion (132) may protrude from four corner regions of the inner circumferential surface of the hole (131). A bottom surface of housing (210) of the auto focus assembly (200) may be disposed on the protruding portion (132) of the first holder (130). The housing (210) may be secured to the protruding portion (132) of the first holder (130). The housing (210) may be coupled to the protruding portion (132) of the first holder (130). The housing (210) may be bonded to the protruding portion (132) of the first holder (130) using an adhesive.

The camera device (10) may comprise a cover member (140). The fixed unit (100) may comprise the cover member (140). The cover member (140) may be coupled to the base (120). The cover member (140) may be coupled to the first holder (130). The cover member (140) may be secured to the base (120). The cover member (140) may be secured to the first holder (130). The cover member (140) may cover at least a portion of the base (120). The cover member (140) may cover at least a portion of the first holder (130).

The cover member (140) may be a "cover can" or "shield can". The cover member (140) may be formed of a metal material. The cover member (140) may block an electromagnetic interference (EMI). The cover member (140) may be electrically connected to the first substrate (110). The cover member (140) may be grounded to the first substrate (110).

The cover member (140) may comprise a top plate. The cover member (140) may comprise a hole formed in the top plate. The hole may be formed at a location corresponding to that of the lens (250). The cover member (140) may comprise a side plate. The side plate may comprise a plurality of side plates. The side plate may comprise four side plates. The side plate may comprise a first to fourth side plate. The side plate may comprise a first and second side plate disposed opposite each other, and a third and fourth side plate disposed opposite each other. The cover member (140) may comprise a plurality of corners among the plurality of side plates.

Throughout the specification, the cover member (140) has been described as a component of the fixed unit (100), but the cover member (140) can be understood as a separate configuration from the fixed unit (100). The cover member (140) may be coupled to the fixed unit (100). The cover member (140) may cover the auto focus assembly (200).

The camera device (10) may comprise a stiffener (150). The stiffener (150) may be SUS. The stiffener (150) may cover a hole in the base (120) from below. The base (120) may comprise holes that overlap the image sensor (330) in the optical axis direction. On the underside of the base (120), the stiffener (150) may be disposed to cover the holes in the base (120).

The camera device (10) may comprise an auto focus assembly (200). At least a portion of the auto focus assembly (200) may be movable in the optical axis direction relative to the fixed unit (100). The auto focus assembly (200) may be disposed on the fixed unit (100). The auto focus assembly (200) may be disposed within the fixed unit (100). The auto focus assembly (200) may be mounted within the fixed unit (100). The auto focus assembly (200) may be coupled within the fixed unit (100). The auto focus assembly (200) may be secured within the fixed unit (100). The auto focus (AF) function may be performed by moving the bobbin (220) and lens (250) of the auto focus assembly (200) in an optical axial direction relative to the fixed unit (100). The auto focus assembly (200) may be disposed on the moving unit (300).

The camera device (10) may comprise a housing (210). The auto focus assembly (200) may comprise the housing (210). The housing (210) may be disposed on the fixed unit (100). The housing (210) may be secured to the fixed unit (100). The housing (210) may be coupled to the fixed unit (100). The housing (210) may be adhesively bonded to the fixed unit (100) using an adhesive. The housing (210) may be bonded to the fixed unit (100) by an adhesive. The housing (210) may be disposed on the first holder (130). The housing (210) may be secured to the first holder (130). The housing (210) may be coupled to the first holder (130). The housing (210) may be adhesively bonded to the first holder (130) using an adhesive.

The camera device (10) may comprise a bobbin (220). The auto focus assembly (200) may comprise the bobbin (220). The bobbin (220) may be disposed underneath the first substrate (110). The bobbin (220) may be spaced apart underneath the first substrate (110). The bobbin (220) may be disposed within the housing (210). The bobbin (220) may be disposed on an inner side of the housing (210). At least a portion of the bobbin (220) may be accommodated in the housing (210). The bobbin (220) may be disposed within the first holder (130). The bobbin (220) may be disposed on an inner side of the first holder (130). At least a portion of the bobbin (220) may be accommodated in the first holder (130). The bobbin (220) may be movably disposed in the housing (210). The bobbin (220) may be movably disposed in the housing (210) in the optical axis direction. The bobbin (220) may be coupled to the lens (250). The bobbin (220) may comprise a hollow hole or a hole. The lens (250) may be disposed in the hollow hole or hole of the bobbin (220). An inner circumferential surface of the bobbin (220) may be coupled to an outer circumferential surface of the lens (250).

The camera device (10) may comprise an AF driving unit. The auto focus assembly (200) may comprise the AF driving unit. The AF actuator may move the bobbin (220) in the optical axis direction. The AF actuator may move the bobbin (220) relative to the housing (210). The AF actuator can move the lens (250) in the optical axis direction. The AF actuator may perform an auto focus (AF) function. The AF actuator can move the bobbin (220) in an upward direction of the optical axis. The AF actuator can move the bobbin (220) in the downward direction of the optical axis. The AF actuator can move the lens (250) in the upward direction of the optical axis. The AF actuator can move the lens (250) in the downward direction of the optical axis. The AF actuator can move the lens (250) in the optical axis direction relative to the housing (210).

The camera device (10) may comprise an AF coil (230). The auto focus assembly (200) may comprise the AF coil (230). An AF driving unit may comprise the AF coil (230). The AF coil (230) may be used for AF driving. The AF coil (230) may be disposed on the bobbin (220). The AF coil (230) may be secured to the bobbin (220). The AF coil (230) may be coupled to the bobbin (220). The AF coil (230) may be bonded to the bobbin (220) using an adhesive. The AF coil (230) may be disposed around a peripheral surface of the bobbin (220). The AF coil (230) may be electrically connected to the driver IC (480). The AF coil (230) may be electrically connected to the lower elastic member (242), the sensing board (470), and the driver IC (480). The AF coil (230) may receive a current from the driver IC (480).

The AF coil (230) may be disposed in a position corresponding to that of the AF magnet (235). AF coil (230) may be disposed on bobbin (220) in a position corresponding to that of the AF magnet (235). The AF coil (230) may face the AF magnet (235). The AF coil (230) may comprise a side facing the AF magnet (235). The AF coil (230) may be disposed adjacent to the AF magnet (235). The AF coil (230) may interact with the AF magnet (235). The AF coil (230) may electromagnetically interact with the AF magnet (235).

The AF coil (230) can move the bobbin (220) in the optical axis direction. The AF coil (230) can move the lens (250) in the optical axis direction. The AF coil (230) can move the bobbin (220) in an upward direction of the optical axis. The AF coil (230) can move the lens (250) in the upward direction of the optical axis. The AF coil (230) can move the bobbin (220) in the downward direction of the optical axis. The AF coil (230) can move the lens (250) in a downward direction of the optical axis. The AF coil (230) can move the bobbin (220) and the lens (250) in the optical axis direction through interaction with the AF magnet (235).

The camera device (10) may comprise an AF magnet (235). The auto focus assembly (200) may comprise the AF magnet (235). The AF driving unit may comprise the AF magnet (235). The AF magnet (235) may be used for AF driving. The AF magnet (235) may be a magnet. The AF magnet (235) may be a permanent magnet.

The AF magnet (235) may be disposed in the housing (210). The AF magnet (235) may be secured to the housing (210). The AF magnet (235) may be coupled to the housing (210). The AF magnet (235) may be bonded to the housing (210) using an adhesive. The AF magnet (235) may be disposed in the housing (210) in a position corresponding to that of the AF coil (230).

The AF magnet (235) may not overlap an OIS magnet (410) in a direction perpendicular to the optical axis. The AF magnet (235) may not overlap the OIS magnet (410) in the optical axis direction. The AF magnet (235) may be disposed on a side portion of the housing (210). The OIS magnet (410) may be disposed in a corner region of a second holder (340).

The AF magnet (235) may be a two-pole magnetized magnet comprising one N-pole region and one S-pole region. In a variation, the AF magnet (235) may be a four-pole magnetized magnet comprising two N-pole regions and two S-pole regions.

The AF magnet (235) may comprise a plurality of magnets. The AF magnet (235) may comprise two magnets. The AF magnet (235) may comprise first and second unit magnets. The first and second unit magnets may be disposed symmetrically about the optical axis. The first and second unit magnets may be formed of the same size and shape as each other.

In a variation, the AF magnet (235) may be disposed in the bobbin (220) and the AF coil (230) may be disposed in housing (210).

The camera device (10) may comprise an elastic member (240). The auto focus assembly (200) may comprise the elastic member (240). The elastic member (240) may be a support member. The elastic member (240) may connect the housing (210) and the bobbin (220). The elastic member (240) may elastically connect the housing (210) and the bobbin (220). The elastic member (240) may moveably support the bobbin (220) relative to the housing (210). The elastic member (240) may be deformed as the bobbin (220) is moved. The elastic member (240) may return the bobbin (220) to its initial position via a resilient (elastic or restoring) force when the bobbin (220) ends traveling. The elastic member (240) may comprise a leaf spring. The elastic member (240) may comprise a spring. The elastic member (240) may be elastic in at least a portion. The elastic member (240) may provide a resilient force to the bobbin (220).

The camera device (10) may comprise an upper elastic member (241). The auto focus assembly (200) may comprise the upper elastic member (241). The elastic member (240) may comprise the upper elastic member (241). The upper elastic member (241) may be disposed on top of a lower elastic member (242). The upper elastic member (241) may comprise an inner portion that engages the bobbin (220). The inner portion of the upper elastic member (241) may be coupled to an upper portion of the bobbin (220). An inner portion of the upper elastic member (241) may be disposed on an upper surface of the bobbin (220). The upper elastic member (241) may comprise an outer portion that is coupled to the housing (210). The outer portion of the upper elastic member (241) may be coupled to a lower portion of the housing (210). The outer portion of the upper elastic member (241) may be disposed on a bottom side of the housing (210). The upper elastic member (241) may comprise a connector connecting the inner and outer portions. The connector may have elasticity.

The camera device (10) may comprise a lower elastic member (242). The auto focus assembly (200) may comprise the lower elastic member (242). The elastic member (240) may comprise the lower elastic member (242).

The camera device (10) may comprise the lower elastic member (242). The elastic member (240) may comprise the lower elastic member (242). The lower elastic member (242) may be disposed below the upper elastic member (241). The lower elastic member (242) may comprise an inner portion that engages the bobbin (220). The inner portion of the lower elastic member (242) may be coupled to a lower portion of the bobbin (220). An inner portion of the lower elastic member (242) may be disposed on the underside of the bobbin (220). The lower elastic member (242) may comprise an outer portion that is coupled to the housing (210). The outer portion of the lower elastic member (242) may be coupled to an upper portion of the housing (210). The outer portion of the lower elastic member (242) may be disposed on an upper surface of the housing (210). The lower elastic member (242) may comprise a connector connecting the inner and outer portions. The connector may have elasticity.

The lower elastic member (242) may comprise a plurality of lower elastic members. The lower elastic member may comprise two lower elastic members. The lower elastic member (242) may comprise first and second lower elastic members (242-1, 242-2). The first and second lower elastic members (242-1, 242-2) may electrically connect the sensing substrate (470) and the AF coil (230).

The camera device (10) may comprise a lens (250). The auto focus assembly (200) may comprise the lens (250). The lens (250) may be coupled to the bobbin (220). The lens (250) may be secured to the bobbin (220). The lens (250) may be integrally movable with the bobbin (220). The lens (250) may be threadedly coupled to the bobbin (220). The lens (250) may be adhesively bonded to the bobbin (220) using an adhesive. The lens (250) may be disposed in a position corresponding to that of the image sensor (330). An optical axis of the lens (250) may be aligned with an optical axis of the image sensor (330). The optical axis may be the z-axis. The lens (250) may comprise a plurality of lenses. The lens (250) may comprise five or six lenses. The lens (250) can be understood as a separate configuration from the auto focus assembly (200). The lens (250) may be coupled to the auto focus assembly (200).

The camera device (10) may comprise a lens module. The lens module may be coupled to a bobbin (220). The lens module may comprise a barrel, and one or more lenses (250) disposed within the barrel.

The camera device (10) may comprise a moving unit (300). The moving unit (300) may be movable relative to the fixed unit (100). The moving unit (300) may move in a direction perpendicular to the optical axis direction relative to the fixed unit (100). The moving unit (300) may be disposed within the fixed unit (100). The moving unit (300) may be movably disposed within the fixed unit (100). The moving unit (300) may be movably disposed within the fixed unit (100) in a direction perpendicular to the optical axis direction. By moving the moving unit (300) in a direction perpendicular to the optical axis direction relative to the fixed unit (100), the image stabilization (OIS) function may be performed. The moving unit (300) may be disposed between the auto focus assembly (200) and the base (120). The moving unit (300) may be disposed below the auto focus assembly (200).

The camera device (10) may comprise a second substrate (310). The moving unit (300) may comprise the second substrate. The second substrate (310) may be a substrate. The second substrate (310) may be a printed circuit board (PCB). The second substrate (310) may be a sensor board. The second substrate (310) may be disposed between the auto focus assembly (200) and the base (120). The second substrate (310) may be disposed between the bobbin (220) and the base (120).

The second substrate (310) may be disposed between the lens (250) and the base (120). The second substrate (310) may be spaced apart from the fixed unit (100). The second substrate (310) may be spaced apart from the fixed unit (100) in an optical axis direction and a direction perpendicular to the optical axis direction. The second substrate (310) may be movable in a direction perpendicular to the optical axis direction. An image sensor (330) may be disposed on the second substrate (310). The image sensor (330) may be mounted on the second substrate (310). The second substrate (310) may be mounted with the image sensor (330). The image sensor (330) may be coupled to the second substrate (310) by wire bonding. The second substrate (310) may be electrically connected to the image sensor (330). The second substrate (310) may be integrally movable with the image sensor (330).

The camera device (10) may comprise an image sensor (330). The moving unit (300) may comprise the image sensor (330). The image sensor (330) may be disposed on the second substrate (310). The image sensor (330) may be disposed between the second substrate (310) and the sensor base (350). The image sensor (330) may be electrically connected to the second substrate (310). The image sensor (330) may be integrally movable with the second substrate (310).

In a variation, the image sensor (330) may be disposed on a separate substrate from the second substrate (310), and the separate substrate may be bonded to the underside of the second substrate (310). At this time, the second substrate (310) may comprise a hole in which the image sensor (330) is disposed.

The image sensor (330) may receive a light that has passed through the lens (250) and a filter (360), whereby an image may be formed. The image sensor (330) may be electrically connected to the second substrate (310) and the first substrate (110). The image sensor (330) may comprise an active image area. The image sensor (330) can convert a light illuminating the active image area into an electrical signal. The image sensor (330) may comprise one or more of a charge coupled device (CCD), a metal oxide semiconductor (MOS), a CPD, and a CID.

The camera device (10) may comprise a second holder (340). The moving unit (300) may comprise the second holder (340). The second holder (340) may be formed of an insulating material. The second holder (340) may be disposed on the second substrate (310). The second holder (340) may be disposed on the second substrate (310). The second holder (340) may be disposed on top of the second substrate (310).

The second holder (340) may be secured to the second substrate (310). The second holder (340) may be coupled to the second substrate (310). The second holder (340) may comprise a hollow hole or a hole in which the image sensor (330) is disposed. An OIS coil (420) may be disposed in the second holder (340). The second holder (340) may comprise a protrusion around which the OIS coil (420) is wound. The second holder (340) may comprise a hole in which a Hall sensor (425) is disposed.

The camera device (10) may comprise a sensor base (350). The moving unit (300) may comprise the sensor base (350). The sensor base (350) may be disposed on the second substrate (310). The sensor base (350) may comprise a hole formed in a position corresponding to that of the image sensor (330). The sensor base (350) may comprise a groove in which the filter (360) is disposed.

The camera device (10) may comprise a filter (360). The moving unit (300) may comprise the filter (360). The filter (360) may be disposed between the lens (250) and the image sensor (330). The filter (360) may be disposed on the sensor base (350). The filter (360) can block certain frequency bands of light from entering the image sensor (330) from a light that has passed through the lens (250). The filter (360) may comprise an infrared cutoff filter. The filter (360) can block infrared light from entering the image sensor (330).

The camera device (10) may comprise a terminal member (370). The terminal member (370) may be an interposer. The terminal member (370) may connect a wire (800) and the second substrate (310). The terminal member (370) may electrically connect the wire (800) and the second substrate (310). The terminal member (370) may be coupled to the second holder (340). The terminal member (370) may comprise a body part (371). The body part (371) may be formed of an insulating material. The body part (371) may be an insulating portion. The body part (371) may be an insulator. However, the body part (371) may comprise conductive regions. The body part (371) may be disposed on the second holder (340).

The terminal member (370) may comprise a terminal (372). The terminal (372) may be disposed on the body part (371). The terminal (372) may be formed of a metal. The terminal (372) may be formed of a conductive member. The terminal (372) may be elastic in at least a portion.

The terminal (372) may comprise a first portion (373). The first portion (373) may be disposed on the body part (371). The terminal (372) may comprise a second portion (374). The second portion (374) may extend to one side from the first portion (373). The second portion (374) may be coupled to the wire (800). The second portion (374) may comprise a bent portion. The second portion (374) may be elastic. The terminal (372) may comprise a third portion (375). The third portion (375) may extend to the other side from the first portion (373). The third portion (375) may be coupled to the second substrate (310).

The camera device (10) may comprise an OIS driving unit. The OIS driving unit may move the moving unit (300)

relative to the fixed unit (100). The OIS driving unit may move the moving unit (300) in a direction perpendicular to the optical axis direction. The OIS driving unit can move the second substrate (310) in a direction perpendicular to the optical axis direction. The OIS driving unit may move the image sensor (330) in a direction perpendicular to the optical axis direction. The OIS driving unit can move the second holder (340) in a direction perpendicular to the optical axis direction. The OIS driving unit may move the sensor base (350) in a direction perpendicular to the optical axis direction. The OIS driving unit may move the filter (360) in a direction perpendicular to the optical axis direction.

The OIS driving unit may perform the image stabilization (OIS) function. The OIS driving unit may comprise an OIS magnet (410). The OIS driving unit may comprise an OIS coil (420). The OIS driving unit may move the image sensor (330) in a direction perpendicular to the optical axis direction relative to the fixed unit (100).

The OIS driving unit may move the moving unit (300) in a first direction perpendicular to the optical axis direction. The OIS driving unit can move the moving unit (300) in a second direction perpendicular to the optical axis direction and the first direction. The OIS driving unit may rotate the moving unit (300) about the optical axis.

The camera device (10) may comprise an OIS magnet (410). The driving unit may comprise the OIS magnet (410). The OIS magnet (410) may be used for the OIS driving. The OIS magnet (410) may be a magnet. The OIS magnet (410) may be a permanent magnet. One of the AF magnet (235) and the OIS magnet (410) may be the first magnet and the other may be the second magnet.

The OIS magnet (410) may be disposed on the fixed unit (100). The OIS magnet (410) may be secured to the fixed unit (100). The OIS magnet (410) may be coupled to the fixed unit (100). The OIS magnet (410) may be bonded to the fixed unit (100) with an adhesive. The OIS magnet (410) may be disposed on the first holder (130). The OIS magnet (410) may be secured to the first holder (130). The OIS magnet (410) may be bonded to the first holder (130). The OIS magnet (410) may be bonded to the first holder (130) using an adhesive. The OIS magnet (410) may be disposed at a corner of the first holder (130). The OIS magnet (410) may be disposed by being biased toward a corner of the first holder (130).

The OIS magnet (410) may be a four-pole magnetized magnet comprising two N-pole regions and two S-pole regions. In a variation, the OIS magnet (410) may be a two-pole magnetized magnet comprising one N-pole region and one S-pole region.

The OIS magnet (410) may comprise a plurality of magnets. The OIS magnet (410) may comprise four (4) magnets. The four (4) secondary magnets (420) may be disposed in each of the four corner regions of the fixed unit (100). The OIS magnet (410) may comprise first to fourth unit magnets. The first through fourth unit magnets may be disposed symmetrically about the optical axis. The first through fourth unit magnets may be formed of the same size and shape as each other.

In the present exemplary embodiment, the AF magnet (235) and OIS magnet (410) may be mutually different in sizes. The AF magnet (235) and the OIS magnet (410) may be spaced apart from each other. In the optical axis direction, the thickness of the OIS magnet (410) may be thinner than the thickness of the AF magnet (235). The length of the long axis of the AF magnet (235) may be greater than the length of the long axis of the OIS magnet (410). In a direction perpendicular to the optical axis direction, the AF magnet (235) may not overlap the OIS magnet (410). As a variation, the OIS magnet (410) may be disposed on the moving unit (300) and the OIS coil (420) may be disposed on the fixed unit (100).

The camera device (10) may comprise an OIS coil (420). The driving unit may comprise the OIS coil (420). The OIS coil (420) may be disposed on the moving unit (300). The OIS coil (420) may be fixed to the moving unit (300). The OIS coil (420) may be coupled to the moving unit (300). The OIS coil (420) may be adhesively bonded to the moving unit (300) using an adhesive. The OIS coil (420) may be disposed on the second holder (340). The OIS coil (420) may be secured to the second holder (340). The OIS coil (420) may be coupled to the second holder (340). The OIS coil (420) may be bonded to the second holder (340) with an adhesive. The OIS coil (420) may be disposed by being wound around a projection of the second holder (340). The OIS coil (420) may be disposed on the second holder (340). The OIS coil (420) may be electrically connected to the second substrate (310). Both ends of the OIS coil (420) may be soldered to the second substrate (310). The OIS coil (420) may be coupled to the second substrate (310) using a solder. The OIS coil (420) may be electrically connected to the driver IC (495). The OIS coil (420) may be electrically connected to the second substrate (310) and the driver IC (495). The OIS coil (420) may receive a current from the driver IC (495). One of the AF coil (230) and the OIS coil (420) may be referred to as a first coil and the other as a second coil.

The OIS coil (420) may be disposed in a position corresponding to that of the OIS magnet (410). The OIS coil (420) may be disposed in the second holder (340) in a position corresponding to that of the OIS magnet (410). The OIS coil (420) may be disposed in a position corresponding to that of the OIS magnet (410) in the moving unit (300). The OIS coil (420) may face the OIS magnet (410). The OIS coil (420) may comprise a surface facing the OIS magnet (410). The OIS coil (420) may be disposed adjacent to the OIS magnet (410). The OIS coil (420) may interact with the OIS magnet (410). The OIS coil (420) may electromagnetically interact with the OIS magnet (410).

The OIS coil (420) can move the moving unit (300) in a direction perpendicular to the optical axis direction. The OIS coil (420) can move the second substrate (310) in a direction perpendicular to the optical axis direction. The OIS coil (420) can move the image sensor (330) in a direction perpendicular to the optical axis. The OIS coil (420) can move the second holder (340) in a direction perpendicular to the optical axis direction. The OIS coil (420) can rotate the moving unit (300) about the optical axis. The OIS coil (420) can rotate the second substrate (310) about the optical axis. The OIS coil (420) can rotate the image sensor (330) about the optical axis. The OIS coil (420) can rotate the second holder (340) about the optical axis. The OIS coil (420) may interact with the OIS magnet (410) to move the moving unit (300) in a direction perpendicular to the optical axis direction and rotate it about the optical axis.

The OIS coil (420) may comprise a plurality of coils. The OIS coil (420) may comprise four coils. The OIS coil (420) may comprise a coil for an x-axis shift. The OIS coil (420) may comprise a coil for y-axis shift.

The OIS coil (420) may comprise a second-1 coil (421). The second-1 coil (421) may be a first unit coil. The second-1 coil (421) may be a first sub-coil. The second-1 coil (421) may be a coil for an x-axis shift. The second-1 coil (421) may shift the moving unit (300) in the x-axis direction. The second-1 coil (421) may be elongated in the y-axis. The second-1 coil (421) may comprise a plurality of coils. The second-1 coil (421) may comprise two coils. The two coils of the second-1 coil (421) may be electrically connected to each other. The second-1 coil (421) may comprise a connecting coil connecting the two coils. In this case, the two coils of the second-1 coil (421) may be applied current together. Alternatively, the two coils of the second-1 coil (421) may be electrically isolated from each other and may receive a current individually.

The OIS coil (420) may comprise a second-2 coil (422). The second-2 coil (422) may be a second unit coil. The second-2 coil (422) may be a second sub coil. The second-2 coil (422) may be a coil for a y-axis shift. The second-2 coil (422) may shift the moving unit (300) in the y-axis direction. The second-2 coil (422) may be elongated in the x-axis. The second-1 coil (421) may comprise a plurality of coils. The second-2 coil (422) may comprise two coils. The two coils of the second-2 coil (422) may be electrically connected to each other. The second-2 coil (422) may comprise a connecting coil connecting the two coils. In this case, the two coils of the second-2 coil (422) may be applied a current together. Alternatively, the two coils of the second-2 coil (422) may be electrically isolated from each other and may be applied a current individually.

The camera device (10) may comprise a Hall sensor (425). The Hall sensor (425) may be disposed on the second substrate (310). The Hall sensor (425) may be disposed in a hole in the second holder (340). The Hall sensor (425) may comprise a Hall IC. The Hall sensor (425) may sense the OIS magnet (410). The Hall sensor (425) may detect a magnetic force of the OIS magnet (410). The Hall sensor (425) may face the OIS magnet (410). The Hall sensor (425) may be disposed at a location corresponding to that of the OIS magnet (410).

The Hall sensor (425) may be disposed adjacent to OIS magnet (410). The Hall sensor (425) may detect the position of the moving unit (300). The Hall sensor (425) can detect movement of the moving unit (300). The Hall sensor (425) may be disposed in the hollow hole of the OIS coil (420). The sensed value detected by the hall sensor (425) may be used to feedback the image stabilization driving. The Hall sensor (425) may be electrically coupled to driver IC (495). The Hall sensor (425) may comprise a plurality of Hall sensors. The Hall sensor (425) may comprise three Hall sensors. The Hall sensor (425) may comprise a first to third Hall sensor. The first Hall sensor can detect a displacement of the moving unit (300) in the x-axis direction. The second Hall sensor can detect displacement of the moving unit (300) in the y-axis direction. A third Hall sensor may detect a rotation of the moving unit (300) about the z-axis, either alone or in combination with one or more of the first and second Hall sensors.

The camera device (10) may comprise a sensing magnet (450). The sensing magnet (450) may be disposed on the bobbin (220). The sensing magnet (450) may be secured to the bobbin (220). The sensing magnet (450) may be coupled to the bobbin (220). The sensing magnet (450) may be bonded to the bobbin (220) by an adhesive. The sensing magnet (450) may be formed with a smaller size than that of driving magnets (235, 410). This may minimize the impact of the sensing magnet (450) affected on the driving.

The sensing magnet (450) may be disposed opposite a correction (stabilization) magnet 460. The sensing magnet (450) and the correction magnet (460) may be disposed opposite each other on the bobbin (220).

The camera device (10) may comprise the correction magnet (460). The correction magnet (460) may be a compensation magnet. The compensation magnet (460) may be disposed on the bobbin (220). The compensation magnet (460) may be secured to the bobbin (220). The compensation magnet (460) may be coupled to the bobbin (220).

The correction magnet (460) may be bonded to the bobbin (220) with an adhesive. The correction magnet (460) may be formed with a smaller size than that of the driving magnets (235, 410). By doing so, the impact of the correction magnet (460) on the driving magnets may be minimized. Additionally, the correction magnet (460) may be disposed opposite the sensing magnet (450) to form the magnetic force equilibrium with the sensing magnet (450). This may inhibit tilting that may be caused by the sensing magnet (450).

The camera device (10) may comprise a sensing substrate (470). The sensing substrate (470) may be a substrate. The sensing substrate (470) may be a printed circuit board (PCB). The sensing substrate (470) may be a flexible substrate. The sensing substrate (470) may be an FPCB. The sensing substrate (470) may be coupled to the first substrate (110). The sensing substrate (470) may be connected to the first substrate (110). The sensing substrate (470) may be electrically connected to the first substrate (110). The sensing substrate (470) may be soldered to the first substrate (110). The sensing substrate (470) may be disposed in the housing (210). The sensing substrate (470) may be secured to the housing (210). The sensing substrate (470) may be coupled to the housing (210). The housing (210) may comprise a groove or hole shaped to correspond to the sensing substrate (470). The sensing substrate (470) may be disposed in the groove or hole in the housing (210).

The camera device (10) may comprise a driver IC (480). The driver IC (480) may be an AF driver IC. The driver IC (480) may be electrically connected to the AF coil (230). The driver IC (480) may apply a current to the AF coil (230) to perform AF driving. The driver IC (480) may apply a power to the AF coil (230). The driver IC (480) may apply a current to the AF coil (230). The driver IC (480) may apply a voltage to the AF coil (230). The driver IC (480) may be disposed on the sensing substrate (470). The driver IC (480) may be disposed in a position corresponding to that of the sensing magnet (450). The driver IC (480) may be disposed facing the sensing magnet (450). The driver IC (480) may be disposed adjacent to the sensing magnet (450). The driver IC (480) may sense the sensing magnet (450).

The driver IC (480) may comprise a sensor. The sensor may comprise a Hall IC. The sensor may be disposed in a position corresponding to that of the sensing magnet (450). The sensor may be disposed facing the sensing magnet (450). The sensor may be disposed adjacent to the sensing magnet (450). The sensor may detect the sensing magnet (450). The sensor may detect a magnetic force of the sensing magnet (450). The sensor may detect a position of the lens (250). The sensor may detect movement of the lens (250). The sensed value detected by the sensor may be used for feedback of auto focus driving.

The camera device (10) may comprise a gyro sensor (490). The gyro sensor (490) may be disposed on the first substrate (110). The gyro sensor (490) may detect a shake of the camera device (10). The gyro sensor (490) may sense an angular velocity or a linear velocity caused by the shaking of the camera device (10). The gyro sensor (490) may be electrically coupled to the driver IC (495). The shaking of the camera device (10) detected by the gyro sensor (490) may be used for the image stabilization (OIS) driving.

The camera device (10) may comprise a driver IC (495). The driver IC (495) may be an OIS driver IC. The driver IC (495) may be electrically coupled to the OIS coil (420). The driver IC (495) may apply a current to the OIS coil (420) to perform the OIS driving. The driver IC (495) may apply a power to the OIS coil (420). The driver IC (495) may apply a current to the OIS coil (420). The driver IC (495) may apply a voltage to the OIS coil (420). The driver IC (495) may be disposed on the second substrate (310).

In a variation, the camera device (10) may comprise a connection substrate which is an undisclosed configuration. The connection substrate may be a connector. The connection substrate may be a connection member. The connection substrate may be a flexible substrate. The connection substrate may be a flexible board. The connection board may be a flexible printed circuit board. The connection substrate may be a flexible printed circuit board (FPCB). The connection substrate may be flexible in at least a portion. The second substrate (310) and the connection substrate may be integrally formed.

The connection substrate can support the moving unit (300). The connection substrate may support movement of the movable portion 300. The connecting substrate may movably support the moving unit (300). The connection substrate may connect the moving unit (300) to the fixed unit (100). The connection substrate may connect the first substrate (110) and the second substrate (310). The connection substrate may electrically connect the first substrate (110) and the second substrate (310). The connection substrate may guide movement of the moving unit (300). The connection substrate may guide movement of the moving unit (300) in a direction perpendicular to the optical axis direction. The connection substrate may guide the moving unit (300) to rotate about the optical axis. The connection substrate may limit movement of the moving unit (300) in the optical axis direction. A portion of the connection substrate may be coupled to the base (120).

The connection substrate may comprise a first portion coupled to the first substrate (110), a second portion coupled to the second substrate (310), and a third portion connecting the first and second portions. The third portion may be disposed at least partially parallel to the optical axis. The third portion may be formed such that its length along the optical axis direction is longer than its thickness. The second part of the connecting substrate may be disposed parallel to the second substrate (310) in at least some portions. The third portion of the connecting substrate may be disposed perpendicular to the second portion in at least some portions. The third portion of the connection substrate may be roundly bent at a portion corresponding to a corner of the second substrate (310).

The camera device (10) may comprise a wire (800). The wire (800) may be a wire spring. The wire (800) may be an elastic member. The wire (800) may be a leaf spring, as a variation. The wire (800) may connect the fixed unit (100) and the moving unit (300). The wire (800) may elastically connect the fixed unit (100) and the moving unit (300). The wire (800) may electrically connect the first substrate (110) and the second substrate (310).

The wire (800) may connect the first substrate (110) and the moving unit (300). The wire (800) may moveably support the moving unit (300). The wire (800) may support the moving unit (300) to move or rotate in a direction perpendicular to the optical axis direction. The wire (800) may be disposed in the optical axis direction. The wire (800) may be disposed parallel to the optical axis. The wire (800) may be formed of metal. The wire (800) may be formed of a conductive material. The wire (800) may be elastic in at least a portion. The wire (800) may comprise a plurality of wires. The wire (800) may comprise 36 wires.

In the present exemplary embodiment, the second substrate (310), which is a sensor substrate, may be applied inside the sensor shift VCM (voice coil motor), and electrical elements such as a VCM driving coil, a Hall sensor, a driver IC, and a capacitor are mounted on the substrate, and all the electrical elements comprising the coil move when the VCM is driven. A gyro electric element for OIS control may be embedded in an SMT form on the substrate within the VCM to feedback sensing information of angular velocity or linear velocity caused by hand shake to the driver IC.

The present exemplary embodiment may be a fusion structure of camera circuitry and actuator, where all the electrical elements that implement the OIS function are applied inside the VCM, such that the output PCB connector of the sensor shift VCM becomes the output connector of the final camera device 10.

Hereinafter, operation of the camera device according to an exemplary embodiment of the present embodiment will be described with reference to the drawings.

Figure 14:
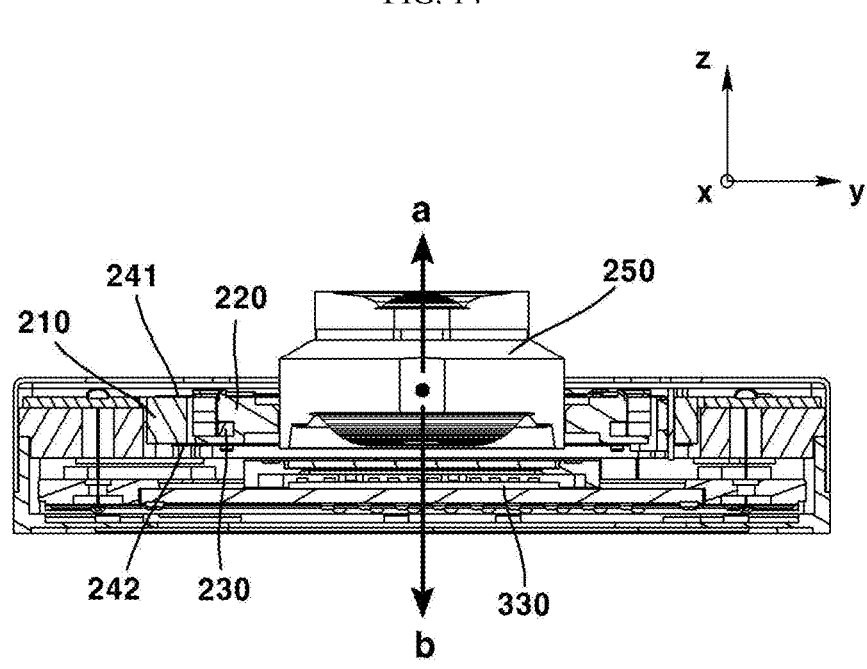
FIG. 14 is a diagram to illustrate the operation of the auto focus function of a camera device according to an exemplary embodiment of the present invention.

FIG. 14 is a drawing to illustrate operation of an auto focus function of a camera device according to an exemplary embodiment of the present invention.

When power is applied to the AF coil (230) of the camera device (10) according to the present exemplary embodiment, an electromagnetic field is formed in the AF coil (230), which can cause the AF coil (230) to move in the optical axis direction (z-axis direction) through electromagnetic interaction with the AF magnet (235). At this time, the AF coil (230) may move in the optical axis direction with the auto focus assembly (200), which comprises the lens (250). In this case, the lens (250) may be moved away from or closer to the image sensor (330) so that a subject is in focus. One or more of a current and a voltage may be applied to energize the AF coil (230).

When a current in the first direction is applied to the AF coil (230) of the camera device (10) according to an exemplary embodiment of the present embodiment, the AF coil (230) may move in the upward direction of the optical axis direction (see a in FIG. 14) through electromagnetic interaction with the AF magnet (235). At this time, the AF coil (230) may move the lens (250) in the upward direction of the optical axis direction to move away from the image sensor (330).

When a current in a second direction opposite to the first direction is applied to the AF coil (230) of the camera device (10) according to an exemplary embodiment of the present embodiment, the AF coil (230) may be moved in the mid-lower optical axis direction (see b in FIG. 14) through electromagnetic interaction with the AF magnet (235). At this time, the AF coil (230) may move the lens (250) in the downward direction of the optical axis direction to bring it closer to the image sensor (330).

Figure 15:
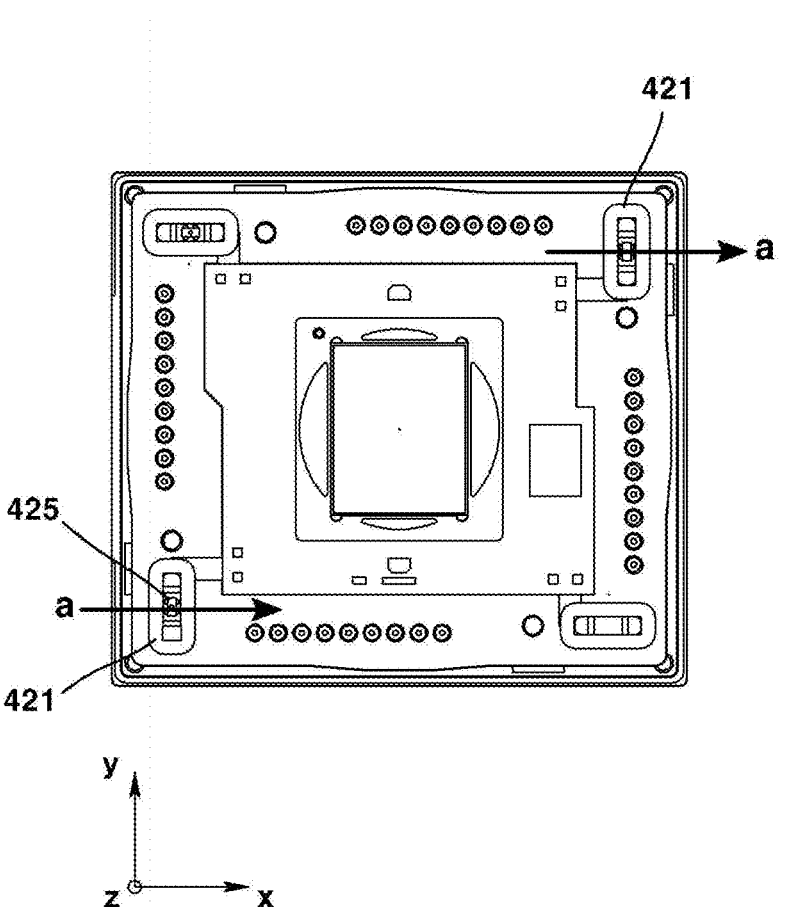
FIGS. 15 through 17 are drawings to illustrate operation of an image stabilization function of a camera device according to an exemplary embodiment of the present invention. More specifically.
Figure 16:
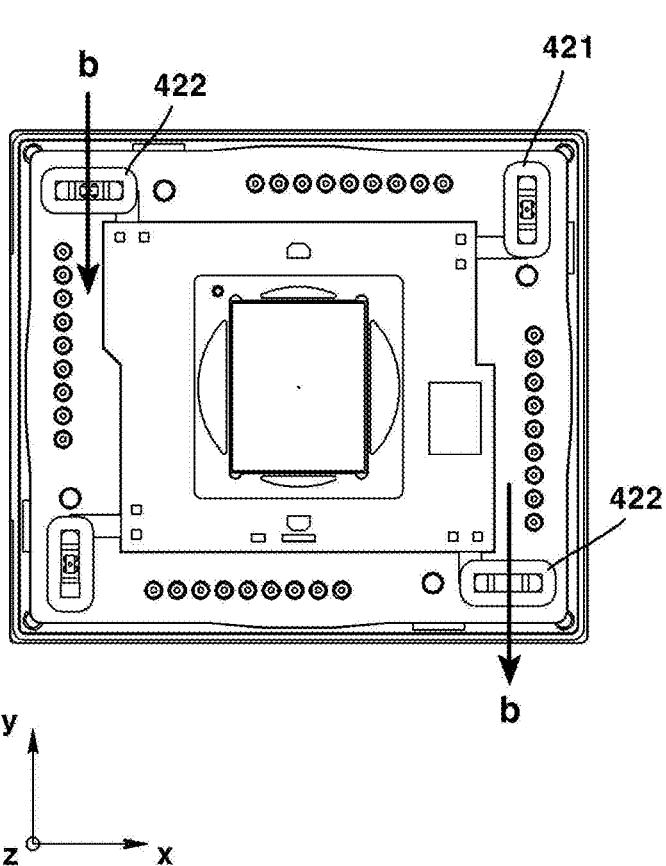
Figure 17:
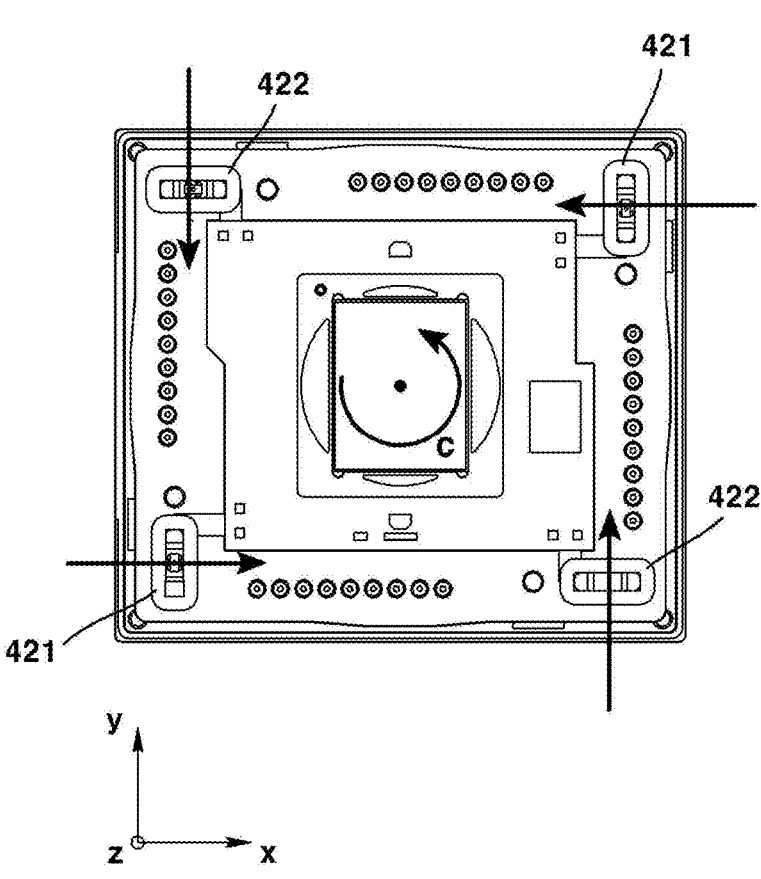

FIGS. 15 through 17 are drawings to illustrate operation of an image stabilization function of a camera device according to an embodiment.

When power is applied to the OIS coil (420) of the camera device (10) according to an exemplary embodiment of the present embodiment, an electromagnetic field is formed in the OIS coil (420) such that the OIS coil (420) can move in a direction perpendicular to the optical axis direction via electromagnetic interaction with the OIS magnet (410). Additionally, the OIS coil (420) may be rotated about the optical axis via electromagnetic interaction with the OIS magnet (410). At this time, the OIS coil (420) may move or rotate with the moving unit (300) comprising the image sensor (330). In the present embodiment, the OIS coil (420)

may move the image sensor (330) to compensate for any shaking of the camera device (10) that is detected by the gyro sensor (490).

FIG. 15 is a drawing to illustrate a driving for shifting an image sensor of a camera device along an x-axis, according to an exemplary embodiment of the present invention.

When a current in the first direction is applied to the second-1 coil (421) of the camera device (10) according to an exemplary embodiment of the present invention, the second-1 coil (421) may move in one of the first directions perpendicular to the optical axis direction (x-axis direction) through electromagnetic interaction with the OIS magnet (410) (see a in FIG. 15). At this time, the second-1 coil (421) may move the image sensor (330) in one of the first directions perpendicular to the optical axis direction. Conversely, when current is applied to the second-1 coil (421) in a second direction opposite to the first direction, the second-1 coil (421) may move in the other direction of the first direction (x-axis direction) perpendicular to the optical axis direction through electromagnetic interaction with the OIS magnet (410). At this time, the second-1 coil (421) may move the image sensor (330) in the other direction of the first directions perpendicular to the optical axis direction.

FIG. 16 is a drawing to illustrate an operation in which an image sensor of a camera device according to an exemplary embodiment of the present invention is shifted along a y-axis.

When a current in the first direction is applied to the second-2 coil (422) of the camera device (10) according to an exemplary embodiment of the present invention, the second-2 coil (422) may move in one of the second directions (y-axis direction) perpendicular to the optical axis direction (see b in FIG. 16) through electromagnetic interaction with the OIS magnet (410). At this time, the second-2 coil (422) can move the image sensor (330) in one of the second directions perpendicular to the optical axis direction. Conversely, when current is applied to the second-2 coil (422) in a second direction opposite to the first direction, the second-2 coil (422) may move in a second direction perpendicular to the optical axis direction (y-axis direction) through electromagnetic interaction with the OIS magnet (410). At this time, the second-2 coil (422) may move the image sensor (330) in the other direction of the second directions perpendicular to the optical axis direction.

FIG. 17 is a drawing to illustrate an operation in which an image sensor of a camera device according to an exemplary embodiment of the present invention is rolled about a z-axis.

When a current in the first direction is applied to the second-1 coil (421) and the second-2 coil (422) of the camera device (10) according to an exemplary embodiment of the present embodiment, the second-1 coil (421) and the second-2 coil (422) may be rotated in a first direction about the optical axis through electromagnetic interaction with the OIS magnet (410) (see c in FIG. 17). At this time, the second-1 coil (421) and the second-2 coil (422) can rotate the image sensor (330) in a unidirectional direction about the optical axis. At this time, the unidirectional direction may be counterclockwise direction. Conversely, when a current in a second direction opposite to the first direction is applied to the second-1 coil (421) and the second-2 coil (422), the second-1 coil (421) and the second-2 coil (422) may be rotated in the other direction about the optical axis through electromagnetic interaction with the OIS magnet (410). At this time, the second-1 coil (421) and the second-2 coil (422) may rotate the image sensor (330) in a different direction about the optical axis. At this time, the other direction may be clockwise direction.

Hereinafter, an optical instrument according to an exemplary embodiment of the present invention will be described with reference to the drawings.

Figure 18:
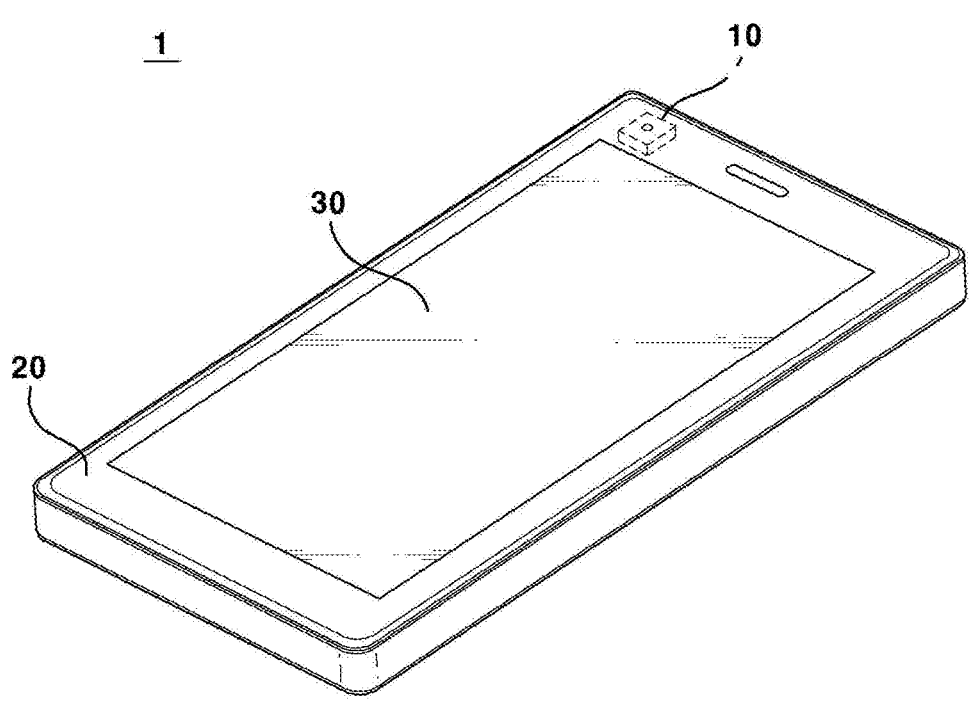
FIG. 18 is a perspective view of an optical instrument according to an exemplary embodiment of the present invention.
Figure 19:
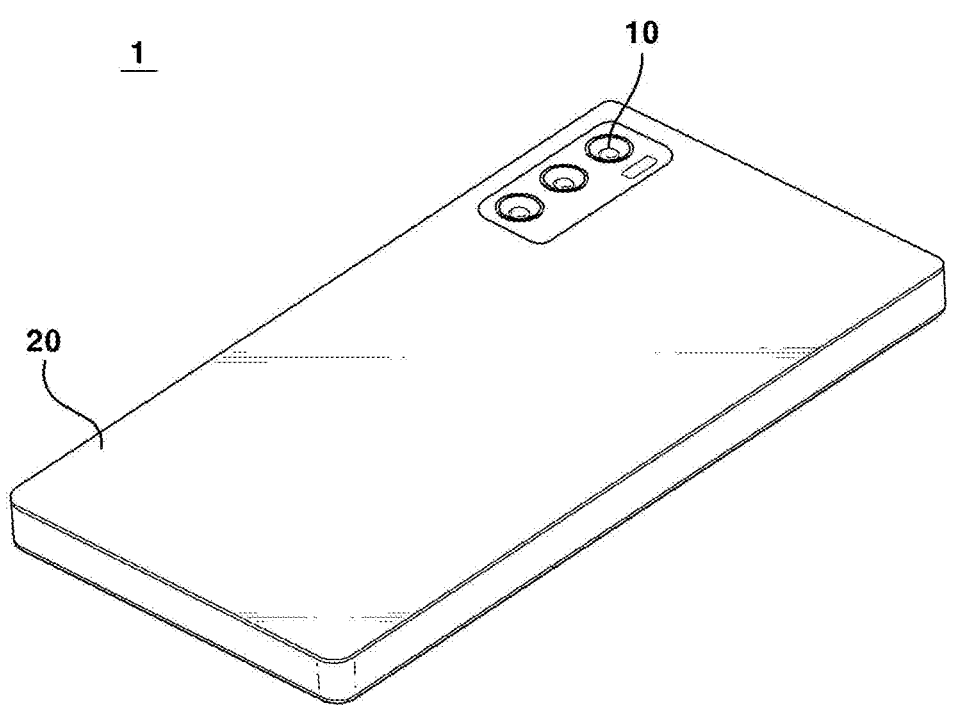
FIG. 19 is a perspective view of an optical instrument according to an exemplary embodiment of the present invention from a different direction than FIG. 18.

FIG. 18 is a perspective view of an optical device according to an embodiment, and FIG. 19 is a perspective view of an optical device according to an embodiment from a different direction than FIG. 18.

The optical instrument (1) may comprise one or more of the following: a cell phone, a mobile phone, a handheld device, a smart phone, a smart pad, a portable smart device, a digital camera, a laptop computer, a digital broadcast terminal, a personal digital assistant (PDA), a portable multimedia player (PMP), and a navigation device. The optical instrument (1) may comprise any device for taking images or photographs.

The optical instrument (1) may comprise a body (20). The optical instrument (1) may comprise a camera device (10). The camera device (10) may be disposed on the body (20). The camera device (10) may photograph a subject. The optical instrument (1) may comprise a display (30). The display (30) may be disposed on the body (20). The display (30) may output at least one of a video and an image taken by the camera device (10). The display (30) may be disposed on a first surface of the body (20). The camera device (10) may be disposed on one or more of a first surface of the body (20) and a second surface opposite the first surface.

While the exemplary embodiments of the present invention have been described with reference to the accompanying drawings, one having ordinary skill in the art to which the present invention belongs will understand that the invention may be practiced in other specific forms without altering its technical ideas or essential features. It should therefore be understood that the embodiments described above are exemplary and non-limiting in all respects.

The invention claimed is:

1. A camera device, comprising:

a fixed unit;

a moving unit comprising an image sensor;

an OIS (Optical Image Stabilization) driving unit configured to move the moving unit with respect to the fixed unit;

an auto focus assembly disposed on the fixed unit; and a lens coupled with the auto focus assembly, wherein the auto focus assembly comprises a housing disposed on the fixed unit, a bobbin disposed in the housing and coupled with the lens, an AF (Auto Focus) driving unit configured to move the bobbin with respect to the housing, and an elastic member connecting the housing and the bobbin, wherein the fixed unit comprises a base, a first holder fixed on the base, and a first substrate disposed on the first holder, and wherein the housing of the auto focus assembly is fixed to the first holder of the fixed unit.

2. The camera device of claim 1, wherein the housing of the auto focus assembly is coupled with the fixed unit by an adhesive.

3. The camera device of claim 1, wherein the first holder comprises a hole, and wherein at least a portion of the auto focus assembly is disposed on the hole of the first holder.

4. The camera device of claim 1, wherein the first holder comprises a hole, and a protruding portion protruding from four corner regions of an inner peripheral surface of the hole, and wherein a lower surface of the housing of the auto focus assembly is disposed on the protruding portion of the first holder.

5. The camera device of claim 4, wherein at least a portion of an outer peripheral surface of the auto focus assembly is spaced apart from the inner peripheral surface of the first holder.

6. The camera device of claim 4, wherein the auto focus assembly is inserted into the hole of the first holder from above in order to be coupled with the first holder.

7. The camera device of claim 1, wherein the AF driving unit is configured to move the lens in an optical axis direction with respect to the housing, and wherein the OIS driving unit is configured to move the image sensor in a direction perpendicular to the optical axis direction with respect to the fixed unit.

8. The camera device of claim 1, wherein the AF driving unit comprises an AF coil disposed on the bobbin, an AF magnet disposed on the housing and disposed at a position corresponding with the AF coil, wherein the OIS driving unit comprises an OIS magnet disposed on the fixed unit, an OIS coil disposed on the moving unit and disposed at a position corresponding with the OIS magnet, and wherein the AF magnet and the OIS magnet are spaced apart from each other.

9. The camera device of claim 8, wherein the AF magnet is not overlapped with the OIS magnet in a direction perpendicular to an optical axis direction.

10. A camera device comprising:

a first holder;

an image sensor disposed on one side of the first holder;

an OIS driving unit configured to move the image sensor with respect to the first holder;

an auto focus assembly coupled with the first holder; and a lens coupled with the auto focus assembly, wherein the auto focus assembly comprises a housing disposed on the first holder, a bobbin disposed in the housing and coupled with the lens, an AF driving unit configured to move the bobbin with respect to the housing, and an elastic member connecting the housing and the bobbin, wherein the first holder comprises a hole, and wherein at least a portion of the auto focus assembly is disposed on the hole of the first holder.

11. The camera device of claim 1, comprising a wire disposed in an optical axis direction, and wherein the wire connects the first substrate and the moving unit.

12. The camera device of claim 11, wherein the moving unit comprises a second substrate disposed with the image sensor, a second holder coupled with the second substrate, and a terminal member coupled with the second holder, wherein the terminal member comprises a body part, and a terminal disposed on the body part, and wherein the terminal comprises a first portion disposed on the body part, a second portion extending from the first portion and coupled with the wire, and a third portion extending from the first portion and coupled with the second substrate.

13. The camera device of claim 8, wherein the auto focus assembly comprises a sensing magnet and a correction magnet disposed opposite each other on the bobbin, a sensing substrate electrically connected with the first substrate, and a driver IC comprising a sensor disposed on the sensing substrate and configured to sense the sensing magnet.

14. The camera device of claim 13, wherein the elastic member comprises an upper elastic member and a lower elastic member disposed below the upper elastic member, wherein the lower elastic member comprises two lower elastic members spaced apart from each other, and wherein the two lower elastic members electrically connect the sensing substrate and the AF coil.

15. The camera device of claim 1, wherein the base comprises a hole overlapped with the image sensor in an optical axis direction, and wherein a stiffener covering the hole of the base is disposed on a lower surface of the base.

16. An optical instrument, comprising:

a body;

the camera device of claim 1 disposed on the body; and a display disposed on the body and outputting a video or image taken by the camera device.

17. The camera device of claim 10, comprising a second holder disposed on one side of the first holder, wherein the image sensor is configured to integrally move with the second holder.

18. The camera device of claim 10, wherein the housing is fixed to the first holder.

19. The camera device of claim 10, wherein at least a portion of an outer peripheral surface of the auto focus assembly is spaced apart from an inner peripheral surface of the hole of the first holder.

20. A camera device comprising:

a fixed unit comprising a first holder and a first substrate disposed on the first holder;

a moving unit comprising an image sensor;

an OIS driving unit configured to move the moving unit with respect to the fixed unit;

an auto focus assembly disposed on the fixed unit; and a lens coupled with the auto focus assembly, wherein the auto focus assembly comprises a housing disposed on the fixed unit, a bobbin disposed in the housing and coupled with the lens, an AF driving unit configured to move the bobbin with respect to the housing, and an elastic member connecting the housing and the bobbin, wherein the first substrate is overlapped with the auto focus assembly in a direction perpendicular to an optical axis direction, wherein the first holder comprises a hole, and wherein at least a portion of the auto focus assembly is disposed on the hole of the first holder.

* * * * *